United States Patent
Grimm et al.

(10) Patent No.: US 9,452,463 B2
(45) Date of Patent: Sep. 27, 2016

(54) SYNTHETIC JET EJECTOR AND DESIGN THEREOF TO FACILITATE MASS PRODUCTION

(71) Applicant: NUVENTIX, INC., Austin, TX (US)

(72) Inventors: Daniel N. Grimm, Round Rock, TX (US); Stephen P. Darbin, Austin, TX (US); Andrew Poynot, Austin, TX (US)

(73) Assignee: Nuventix, Inc., Austin, TX (US)

( * ) Notice: Subject to any disclaimer, the term of this patent is extended or adjusted under 35 U.S.C. 154(b) by 385 days.

(21) Appl. No.: 14/291,729

(22) Filed: May 30, 2014

(65) Prior Publication Data
US 2015/0224560 A1 Aug. 13, 2015

Related U.S. Application Data

(62) Division of application No. 13/026,220, filed on Feb. 12, 2011, now Pat. No. 8,772,987.

(60) Provisional application No. 61/304,427, filed on Feb. 13, 2010.

(51) Int. Cl.
*H01F 41/02* (2006.01)
*B21D 53/02* (2006.01)
(Continued)

(52) U.S. Cl.
CPC ............... *B21D 53/02* (2013.01); *F04F 5/00* (2013.01); *F25D 15/00* (2013.01); *H01F 41/02* (2013.01);
(Continued)

(58) Field of Classification Search
CPC ............. H02K 15/00; H02K 15/0056; H02K 15/0068; H02K 15/0081; H02K 15/08; H02K 33/00; H02K 33/12; H02K 33/18; H04R 9/04; H04R 9/046; H04R 31/00; H04R 31/006; H01F 41/04; H01F 41/10; H01F 41/076; F04F 5/00

USPC ........ 29/594, 596, 605; 310/12.16; 381/397, 381/400–401, 403, 407; 417/75, 151, 413.1
See application file for complete search history.

(56) References Cited

U.S. PATENT DOCUMENTS

| | | |
|---|---|---|
| 3,590,170 A | 6/1971 | Sawyer |
| 4,118,605 A | 10/1978 | Kobayashi |

(Continued)

FOREIGN PATENT DOCUMENTS

| | | |
|---|---|---|
| EP | 1040736 | 4/2000 |
| EP | 1989051 | 12/2008 |

(Continued)

OTHER PUBLICATIONS

International Search Report from corresponding PCT Application No. PCT/US2011/024665 dated May 5, 2011.

*Primary Examiner* — Burton Mullins
(74) *Attorney, Agent, or Firm* — Wolf, Greenfield & Sacks, P.C.

(57) ABSTRACT

A method is provided for making a synthetic jet ejector. The method comprises (a) providing first and second voice coil bodies (131) having first and second sets of channels defined therein, respectively; (b) inserting first and second sets of electrically conductive terminals (139) into the first and second sets of channels, respectively; (c) wrapping first and second coils of wire (151) around said first and second voice coil bodies, respectively, such that the first coil is in electrical contact with the first set of terminals and such that the second coil is in electrical contact with the second set of terminals; (d) forming a voice coil subassembly by attaching first and second ends of a flexible, electrically conductive connector (161) to said first and second voice coil bodies, respectively, wherein the first end of the connector is attached such that it is in electrical contact with the first set of terminals, and wherein the second end of the connector is attached such that it is in electrical contact with the second set of terminals; and (e) incorporating the voice coil subassembly into a synthetic jet ejector (103) having first and second voice coils such that said first coil forms a portion of said first voice coil, and such that said second coil forms a portion of said second voice coil.

22 Claims, 55 Drawing Sheets

(51) Int. Cl.
*H01F 41/04* (2006.01)
*H02K 15/00* (2006.01)
*H01F 41/10* (2006.01)
*H04R 9/04* (2006.01)
*H02K 15/08* (2006.01)
*F25D 15/00* (2006.01)
*H02K 33/12* (2006.01)
*F04F 5/00* (2006.01)

(52) U.S. Cl.
CPC .............. *H01F 41/04* (2013.01); *H01F 41/10* (2013.01); *H02K 15/00* (2013.01); *H02K 15/0056* (2013.01); *H02K 15/0068* (2013.01); *H02K 15/08* (2013.01); *H02K 33/12* (2013.01); *H04R 9/04* (2013.01); *Y10T 29/4902* (2015.01); *Y10T 29/4935* (2015.01)

(56) References Cited

U.S. PATENT DOCUMENTS

| | | | |
|---|---|---|---|
| 5,701,358 A * | 12/1997 | Larsen | H04R 9/063 381/400 |
| 5,758,823 A | 6/1998 | Glezer et al. | |
| 5,894,990 A | 4/1999 | Glezer et al. | |
| 5,966,286 A | 10/1999 | O'Connor et al. | |
| 5,988,522 A | 11/1999 | Glezer et al. | |
| 6,056,204 A | 5/2000 | Glezer et al. | |
| 6,123,145 A | 9/2000 | Glezer et al. | |
| 6,247,525 B1 | 6/2001 | Smith et al. | |
| 6,588,497 B1 | 7/2003 | Glezer et al. | |
| 6,853,734 B2 | 2/2005 | Sahyoun | |
| 7,252,140 B2 | 8/2007 | Glezer et al. | |
| 7,272,237 B2 | 9/2007 | Linn et al. | |
| 7,606,029 B2 | 10/2009 | Mahalingam et al. | |
| 7,607,470 B2 | 10/2009 | Glezer et al. | |
| 7,760,499 B1 | 7/2010 | Darbin et al. | |
| 7,768,779 B2 | 8/2010 | Heffington et al. | |
| 7,784,972 B2 | 8/2010 | Heffington et al. | |
| 7,819,556 B2 | 10/2010 | Heffington et al. | |
| 7,932,535 B2 | 4/2011 | Mahalingam et al. | |
| 8,030,886 B2 | 10/2011 | Mahalingam et al. | |
| 8,035,966 B2 | 10/2011 | Reichenbach et al. | |
| 8,066,410 B2 | 11/2011 | Booth et al. | |
| 8,069,910 B2 | 12/2011 | Beltran et al. | |
| 8,136,576 B2 | 3/2012 | Grimm | |
| 8,272,851 B2 | 9/2012 | Lucas | |
| 8,290,724 B2 | 10/2012 | Darbin et al. | |
| 8,299,691 B2 | 10/2012 | Grimm | |
| 8,388,142 B2 | 3/2013 | Jones et al. | |
| 8,430,644 B2 | 4/2013 | Mahalingam et al. | |
| 8,579,476 B2 | 11/2013 | Mahalingam et al. | |
| 8,646,701 B2 | 2/2014 | Grimm et al. | |
| 8,672,648 B2 | 3/2014 | Glezer et al. | |
| 8,770,765 B2 | 7/2014 | Jones et al. | |
| 8,772,987 B2 | 7/2014 | Grimm et al. | |
| 8,777,456 B2 | 7/2014 | Mahalingam et al. | |
| 8,845,138 B2 | 9/2014 | Booth et al. | |
| 2002/0081198 A1 | 6/2002 | Hassan et al. | |
| 2007/0023169 A1 | 2/2007 | Mahalingam et al. | |
| 2007/0081027 A1 | 4/2007 | Beltran et al. | |
| 2007/0096118 A1 | 5/2007 | Mahalingam et al. | |
| 2007/0119573 A1 | 5/2007 | Mahalingam et al. | |
| 2007/0119575 A1 | 5/2007 | Glezer et al. | |
| 2007/0127210 A1 | 6/2007 | Mahalingam et al. | |
| 2007/0141453 A1 | 6/2007 | Mahalingam et al. | |
| 2007/0272393 A1 | 11/2007 | Reichenbach et al. | |
| 2008/0006393 A1 | 1/2008 | Grimm | |
| 2008/0009187 A1 | 1/2008 | Grimm et al. | |
| 2008/0036566 A1 * | 2/2008 | Klesyk | H01F 27/027 336/84 M |
| 2008/0043061 A1 | 2/2008 | Glezer et al. | |
| 2008/0151541 A1 | 6/2008 | Heffington et al. | |
| 2008/0219007 A1 | 9/2008 | Heffington et al. | |
| 2008/0295997 A1 | 12/2008 | Heffington et al. | |
| 2009/0084866 A1 | 4/2009 | Grimm et al. | |
| 2009/0109625 A1 | 4/2009 | Booth et al. | |
| 2009/0141065 A1 | 6/2009 | Darbin et al. | |
| 2010/0033071 A1 | 2/2010 | Heffington et al. | |
| 2010/0039012 A1 | 2/2010 | Grimm | |
| 2010/0110635 A1 | 5/2010 | Jones et al. | |
| 2010/0263838 A1 | 10/2010 | Mahalingam et al. | |
| 2011/0026218 A1 | 2/2011 | Mahalingam et al. | |
| 2011/0089804 A1 | 4/2011 | Mahalingam et al. | |
| 2011/0198056 A1 | 8/2011 | Grimm et al. | |
| 2012/0111969 A1 | 5/2012 | Mahalingam et al. | |
| 2012/0145361 A1 | 6/2012 | Glezer et al. | |
| 2012/0199667 A1 | 8/2012 | Darbin et al. | |
| 2012/0287637 A1 | 11/2012 | Mahalingam et al. | |
| 2012/0292401 A1 | 11/2012 | Mahalingam et al. | |
| 2012/0298769 A1 | 11/2012 | Heffington et al. | |
| 2013/0083520 A1 | 4/2013 | Booth et al. | |
| 2013/0133865 A1 | 5/2013 | Mahalingam et al. | |
| 2013/0155680 A1 | 6/2013 | Grimm et al. | |
| 2013/0162958 A1 | 6/2013 | Jones et al. | |
| 2013/0188307 A1 | 7/2013 | Mahalingam et al. | |
| 2013/0239589 A1 | 9/2013 | Mahalingam et al. | |
| 2013/0243030 A1 | 9/2013 | Mahalingam et al. | |

FOREIGN PATENT DOCUMENTS

| | | |
|---|---|---|
| GB | 2419644 | 9/2008 |
| WO | WO 2007040875 A2 | 4/2007 |
| WO | 2008048493 | 4/2008 |
| WO | 2011100645 | 8/2011 |
| WO | 2011159961 | 12/2011 |
| WO | 2012158842 | 11/2012 |
| WO | 2013142880 | 9/2013 |

* cited by examiner

SYNTHETIC JET EJECTOR AND DESIGN THEREOF TO FACILITATE MASS PRODUCTION

CROSS-REFERENCE TO RELATED APPLICATIONS

This application is a divisional application which claims the benefit of priority to U.S. patent application Ser. No. 13/026,220, filed Feb. 12, 2011, now allowed, having the same title and the same inventors, and which is incorporated herein by reference in its entirety; which application claims the benefit of U.S. Provisional Application No. 61/304,427, filed Feb. 13, 2010.

FIELD OF THE DISCLOSURE

The present application relates to synthetic jet ejectors and synthetic jet actuators, and to methods for making the same.

BACKGROUND OF THE DISCLOSURE

A variety of thermal management devices are known to the art, including conventional fan based systems, piezoelectric systems, and synthetic jet actuators. The latter type of system has emerged as a highly efficient and versatile solution where thermal management is required at the local level. Frequently, synthetic jet actuators are utilized in conjunction with a conventional fan based system. In such hybrid systems, the fan based system provides a global flow of fluid through the device being cooled, and the synthetic jet ejectors provide localized cooling for hot spots and also augment the global flow of fluid through the device by perturbing boundary layers.

Various examples of synthetic jet ejectors and synthetic jet actuators are known to the art. Some examples include those disclosed in U.S. 20070141453 (Mahalingam et al.) entitled "Thermal Management of Batteries using Synthetic Jets"; U.S. 20070127210 (Mahalingam et al.), entitled "Thermal Management System for Distributed Heat Sources"; 20070119575 (Glezer et al.), entitled "Synthetic Jet Heat Pipe Thermal Management System"; 20070119573 (Mahalingam et al.), entitled "Synthetic Jet Ejector for the Thermal Management of PCI Cards"; 20070096118 (Mahalingam et al.), entitled "Synthetic Jet Cooling System for LED Module"; 20070081027 (Beltran et al.), entitled "Acoustic Resonator for Synthetic Jet Generation for Thermal Management"; and 20070023169 (Mahalingam et al.), entitled "Synthetic Jet Ejector for Augmentation of Pumped Liquid Loop Cooling and Enhancement of Pool and Flow Boiling".

SUMMARY OF THE INVENTION

Figure 1:
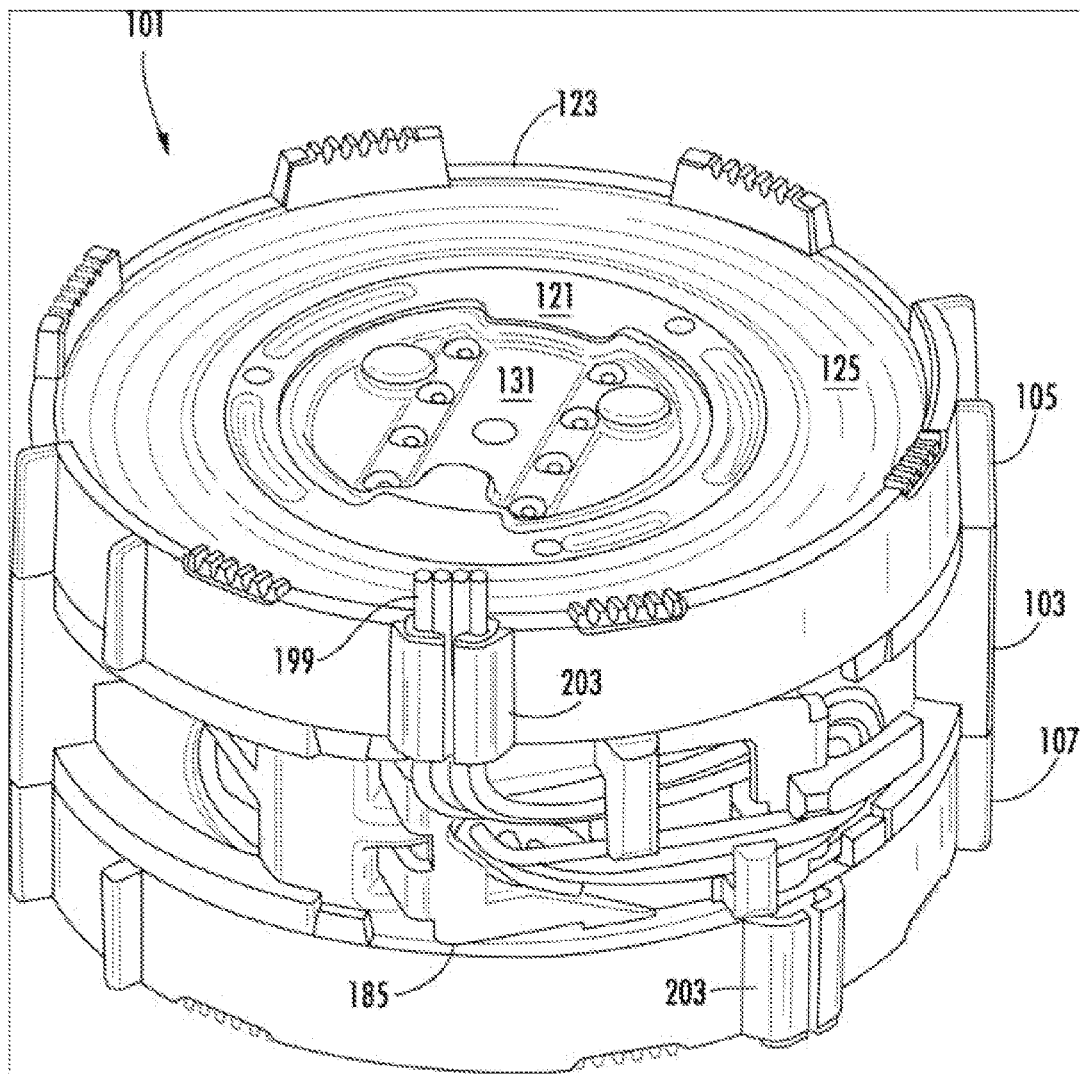
FIG. 1 is a perspective view of a synthetic jet actuator made in accordance with the teachings herein.

In one aspect, a method for making a synthetic jet ejector is provided, comprising (a) providing first and second voice coil bodies having first and second sets of channels defined therein, respectively; (b) inserting first and second sets of electrically conductive terminals into the first and second sets of channels, respectively; (c) wrapping first and second coils of wire around said first and second voice coil bodies, respectively, such that the first coil is in electrical contact with the first set of terminals and such that the second coil is in electrical contact with the second set of terminals; (d) forming a voice coil subassembly by attaching first and second ends of a flexible, electrically conductive connector to said first and second voice coil bodies, respectively, wherein the first end of the connector is attached such that it is in electrical contact with the first set of terminals, and wherein the second end of the connector is attached such that it is in electrical contact with the second set of terminals; and (e) incorporating the voice coil subassembly into a synthetic jet ejector having first and second voice coils such that said first coil forms a portion of said first voice coil, and such that said second coil forms a portion of said second voice coil.

In another aspect, a synthetic jet ejector is provided which comprises (a) first and second voice coil bodies having first and second sets of channels defined therein, respectively; (b) first and second sets of electrically conductive terminals disposed in the first and second sets of channels, respectively; (c) first and second coils of wire coiled around said first and second voice coil bodies, respectively, such that the first coil is in electrical contact with the first set of terminals and such that the second coil is in electrical contact with the second set of terminals; and (d) a flexible, electrically conductive connector having first and second ends attached to said first and second voice coil bodies, respectively, wherein the first end of the connector is attached such that it is in electrical contact with the first set of terminals, and wherein the second end of the connector is attached such that it is in electrical contact with the second set of terminals.

In another aspect, a method for making a synthetic jet ejector is provided which comprises (a) providing a first voice coil body having first and second channels defined therein; (b) inserting first and second electrically conductive terminals into the first and second channels, respectively, of the first voice coil body; (c) wrapping a first coil of wire around said first voice coil body such that a first end of the first coil is in electrical contact with the first terminal, and such that a second end of the first coil is in electrical contact with the second terminal; and (d) attaching a first end of a flexible, electrically conductive connector to said first voice coil body such that the first end of the connector is in electrical contact with the first and second terminals.

In yet another aspect, an electrical connector is provided for connecting first and second electromagnetic coils to an external power source. The connector comprises (a) a central portion having a semiconductor device disposed thereon which is adapted to control the operation of the first and second electromagnetic coils; and (b) first and second flexible arms depending from said central portion, wherein said first arm terminates in a first tab which releasably attaches to said first coil, and wherein said second arm terminates in a second tab which releasably attaches to said second coil.

DETAILED DESCRIPTION

Despite the many advantages of synthetic jet ejectors, a number of problems persist in the art with respect to these devices. In particular, the lack of methods for manufacturing synthetic jet ejectors and their components in large volumes and in a cost efficient manner remains an impediment to the commercial implementation of these devices. It is an added challenge to achieve the foregoing objectives without compromising the mechanical integrity of the resulting device. These problems may be addressed with the methodologies and devices disclosed herein.

With reference to FIGS. 1-7, a first particular, non-limiting embodiment of a synthetic jet actuator is depicted which is made in accordance with the teachings herein. The synthetic jet actuator 101 shown therein comprises a main chassis 103 (shown in greater detail in FIGS. 12-17 and FIGS. 41-45) having first 105 and second 107 auxiliary chassis components attached thereto. At least the structural portions of the main 103 chassis and auxiliary chassis 105, 107 components are preferably made out of a suitable plastic, preferably a moldable plastic, and even more preferably a thermoplastic, though in some applications, other materials such as thermosetting plastics, metals such as aluminum, copper and titanium, fiberglass, and various elastomers or rubbers may be used to form some or all of the structures of these components.

The auxiliary chassis components 105, 107 are shown in greater detail in FIGS. 46-49. They are preferably identical, though in some embodiments they may be mirror images of one another or may be otherwise different. The auxiliary chassis components 105, 107 may be permanently or releasably attached to the main chassis 103 with a suitable adhesive, through the application of heat, through one or more coupling elements disposed on the main chassis 103 or the auxiliary chassis components 105, 107 that permanently or releasably engage with each other or with suitable features provided on the other chassis or auxiliary components, or by other suitable means as are known to the art. The various other elements of a synthetic jet ejector incorporating the synthetic jet actuator 101 are attached to or housed within the main 103 and auxiliary chassis 105, 107 components, or are disposed within the housing of the synthetic jet ejector (not shown).

Figure 49:
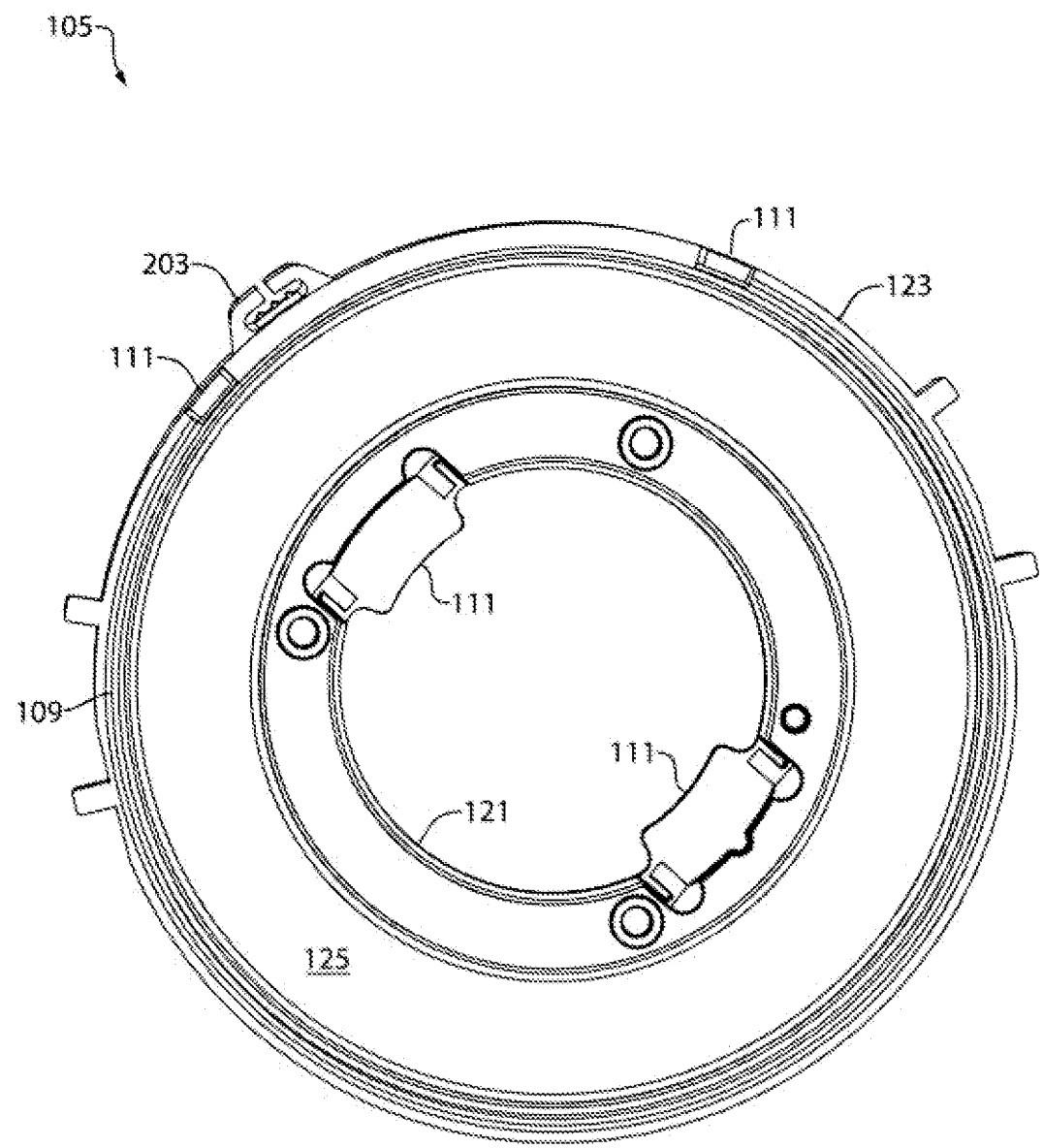
FIG. 49 is a perspective view of an auxiliary chassis component of the synthetic jet actuator of FIG. 1.
Figure 50:
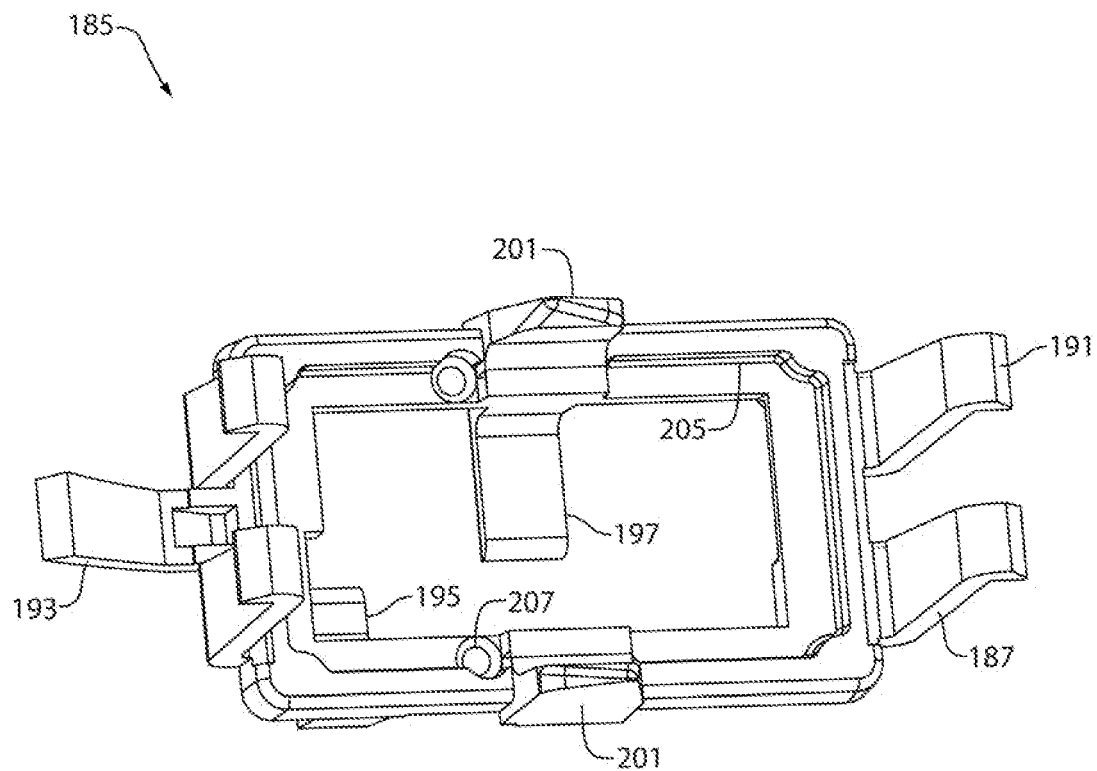
FIG. 50 is a perspective view of the clip of the synthetic jet actuator of FIG. 1.
Figure 51:
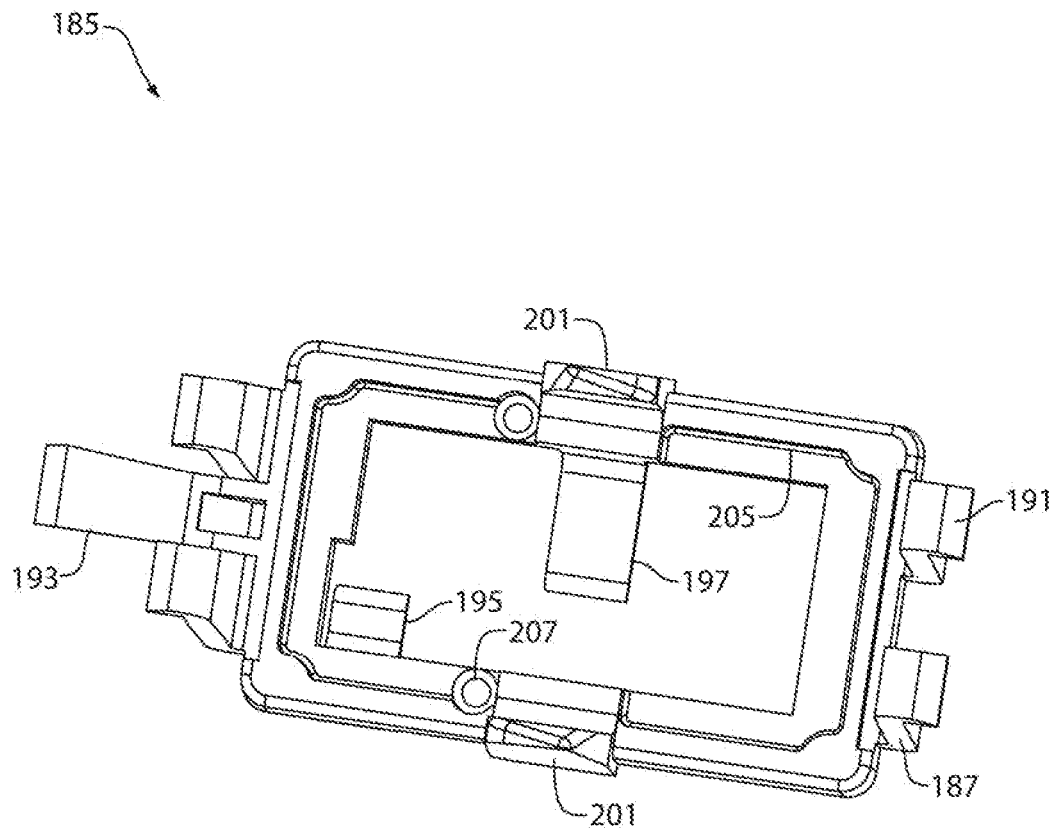
FIG. 51 is a perspective view of the clip of the synthetic jet actuator of FIG. 1.
Figure 52:
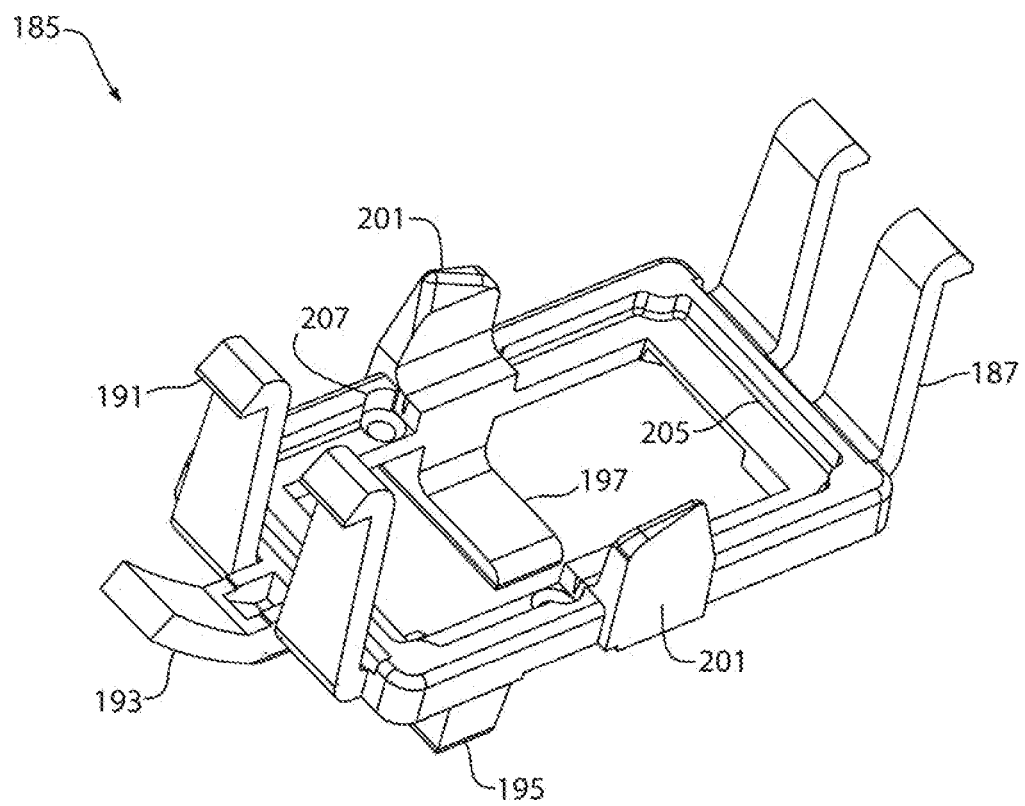
FIG. 52 is a perspective view of the clip of the synthetic jet actuator of FIG. 1.
Figure 53:
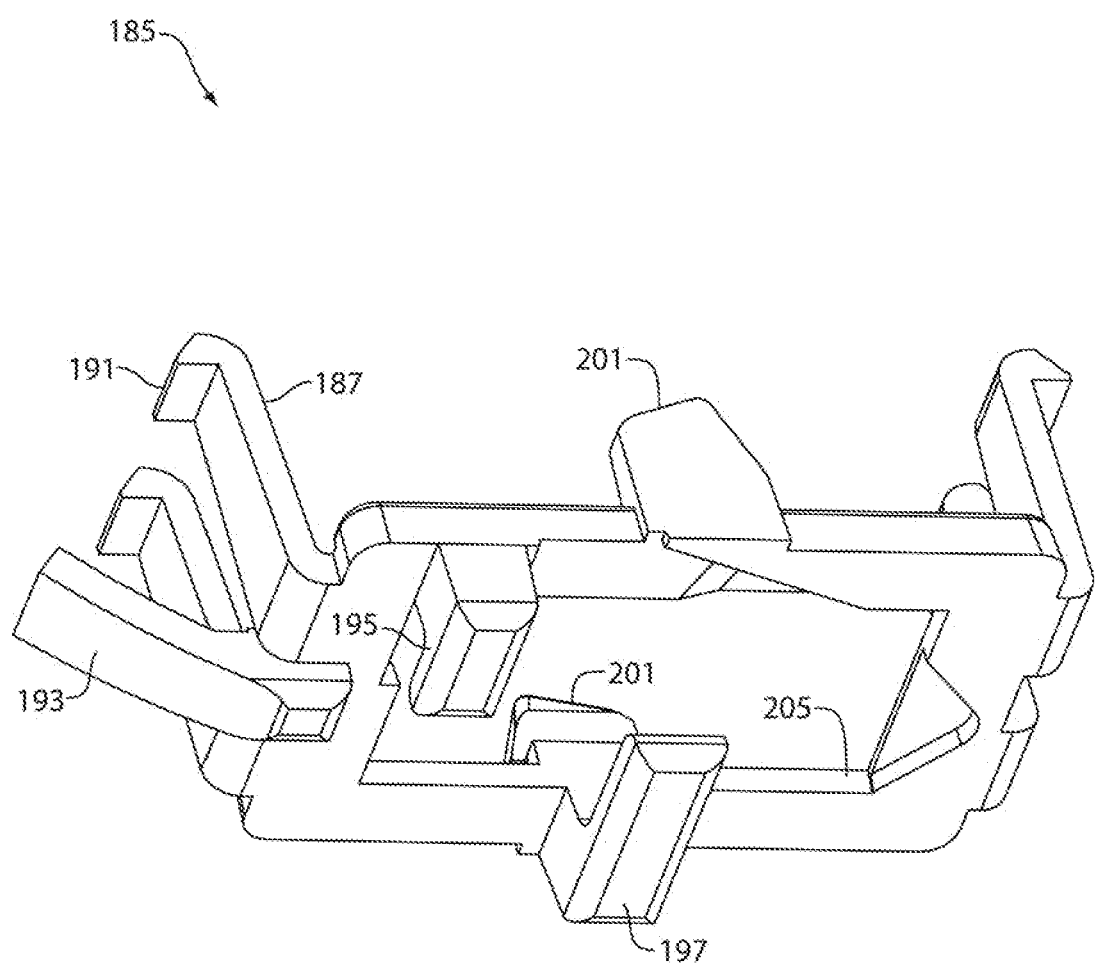
FIG. 53 is a perspective view of the clip of the synthetic jet actuator of FIG. 1.
Figure 54:
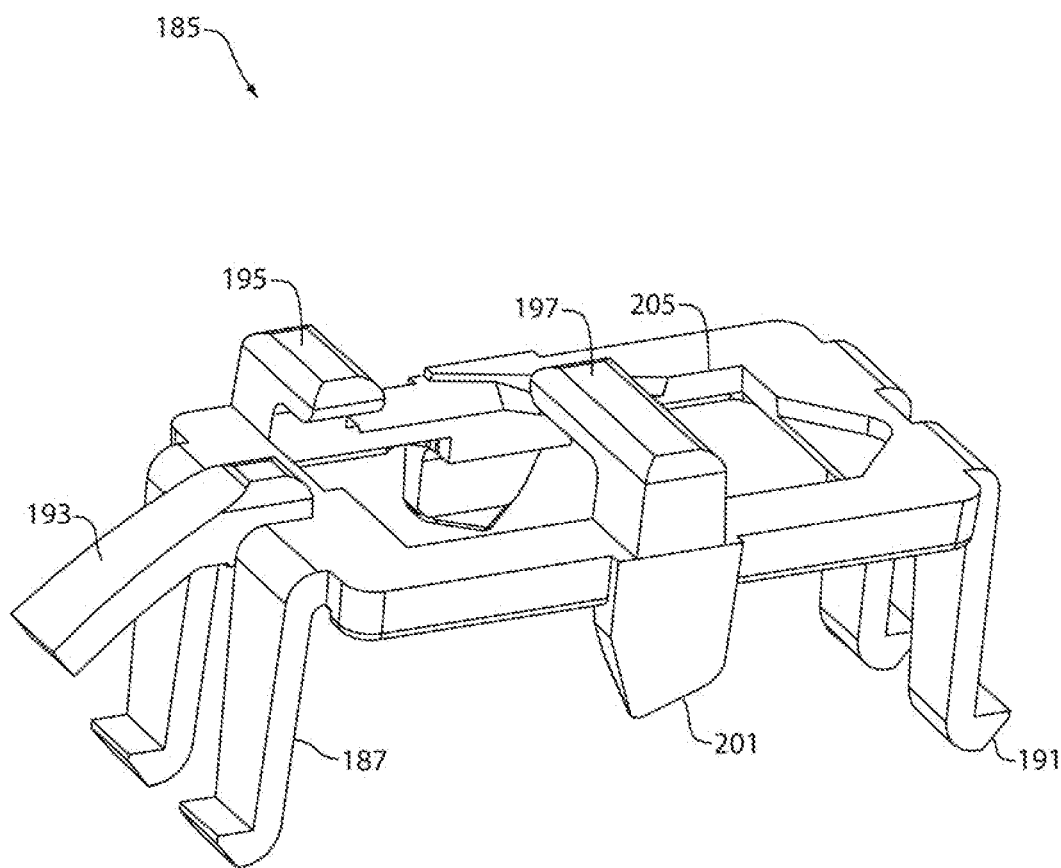
FIG. 54 is a perspective view of the clip of the synthetic jet actuator of FIG. 1.
Figure 55:
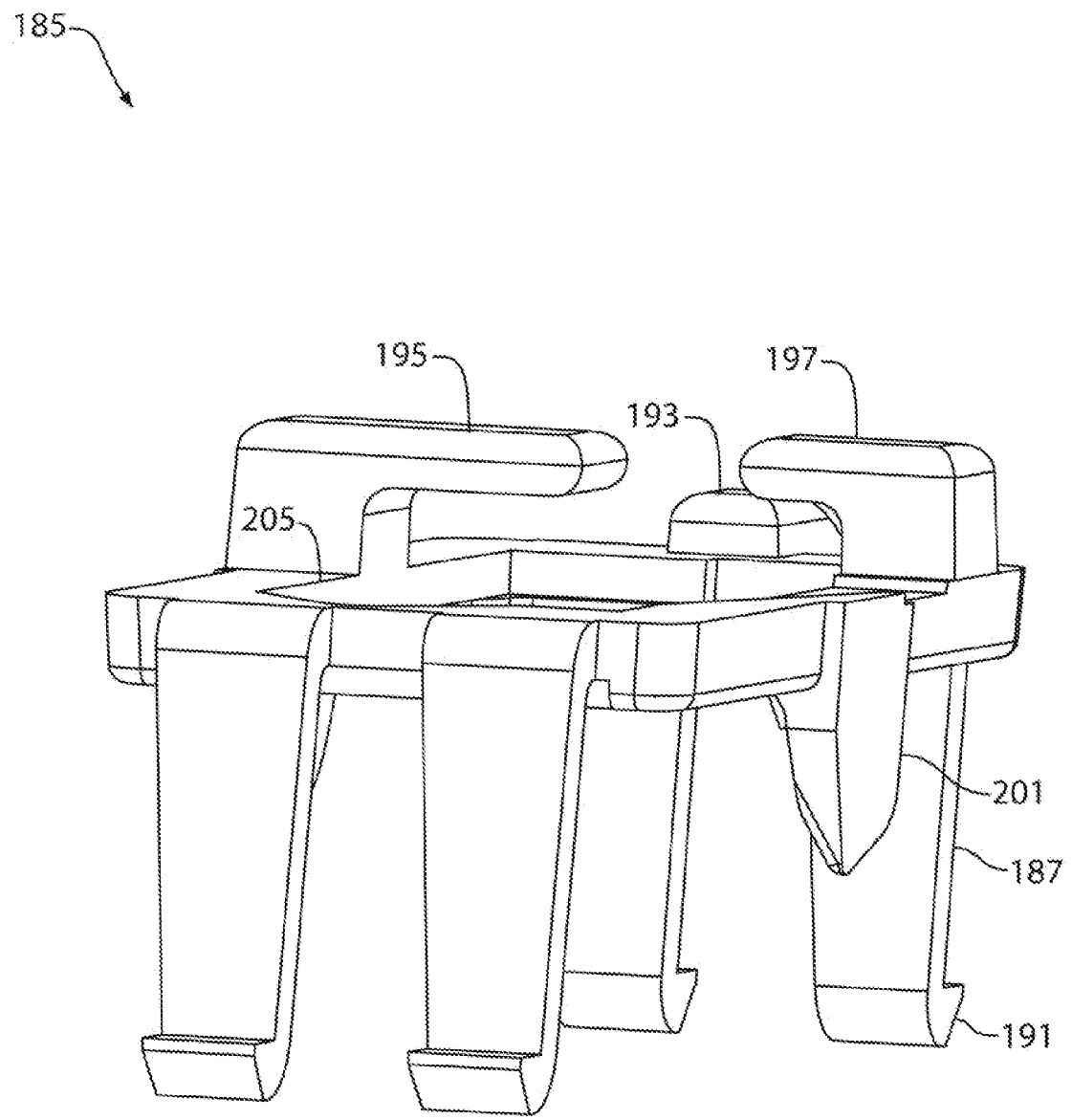
FIG. 55 is a perspective view of the clip of the synthetic jet actuator of FIG. 1.

Referring now to FIG. 49, auxiliary chassis components 105, 107 are equipped with a beveled lip 109 and a pair of tabs 111. The beveled lip 109 sits on a complimentary shaped lip 113 of the main chassis 103 (see, e.g., FIG. 12) and may be held in place, for example, through heat welding or the use of a suitable adhesive. The pair of tabs register with the faceted surfaces 115 and adjacent ledge 117 of the main chassis 103 adjacent to the wiring manifold 119 (see, e.g., FIG. 17, and explained in greater detail below), thus assuring proper alignment or registration of the auxiliary chassis components 105, 107 with the main chassis 103.

Referring to FIGS. 46-49, in the preferred embodiment depicted, auxiliary chassis components 105, 107 have a three component structure consisting of an inner ring 121, an outer ring 123 and a diaphragm 125 which extends between the inner ring 121 and the outer ring 123. In a preferred embodiment, the diaphragm 125 comprises a silicone polymer and is transfer molded in place, followed by annealing at 200° C. for 2-4 hours, to form the completed auxiliary chassis components 105, 107.

FIGS. 18-23 depict the voice coils 131 used in the synthetic jet ejector 101 depicted in FIGS. 1-7. The outer surface 133 of the voice coil 131 is equipped with a pair of opposing indentations or keys 135 which register with a complimentary-shaped set of tabs 111 (see, e.g., FIG. 46) in the auxiliary chassis components 105, 107 to lock the voice coil 131 in the proper orientation.

The voice coils 131 are further equipped with a set of electrically conductive pins 139 which are inserted through parallel channels provided in the body or voice coil body of the voice coils 131. The pins 139 are preferably rectangular in cross-section, and the channels preferably have a cross-sectional shape which is complimentary to the shape of the pins 139, thus minimizing the lateral and rotational movement of the pins 139 within the channels. The pins 139 are sized so that they extend slightly from each end of the channels. Of course, it will be appreciated that various other geometries or relative dimensions of the pins and other components may be utilized to similar effect. Thus, for example, the pins may have a variety of cross-sections at one or more points along their longitudinal axis, and these cross-sections may be polygons (including, but not limited to, triangles, squares, rectangles, parallelograms, pentagons and hexagons), circles, ellipses, or irregular shapes.

Figure 20:
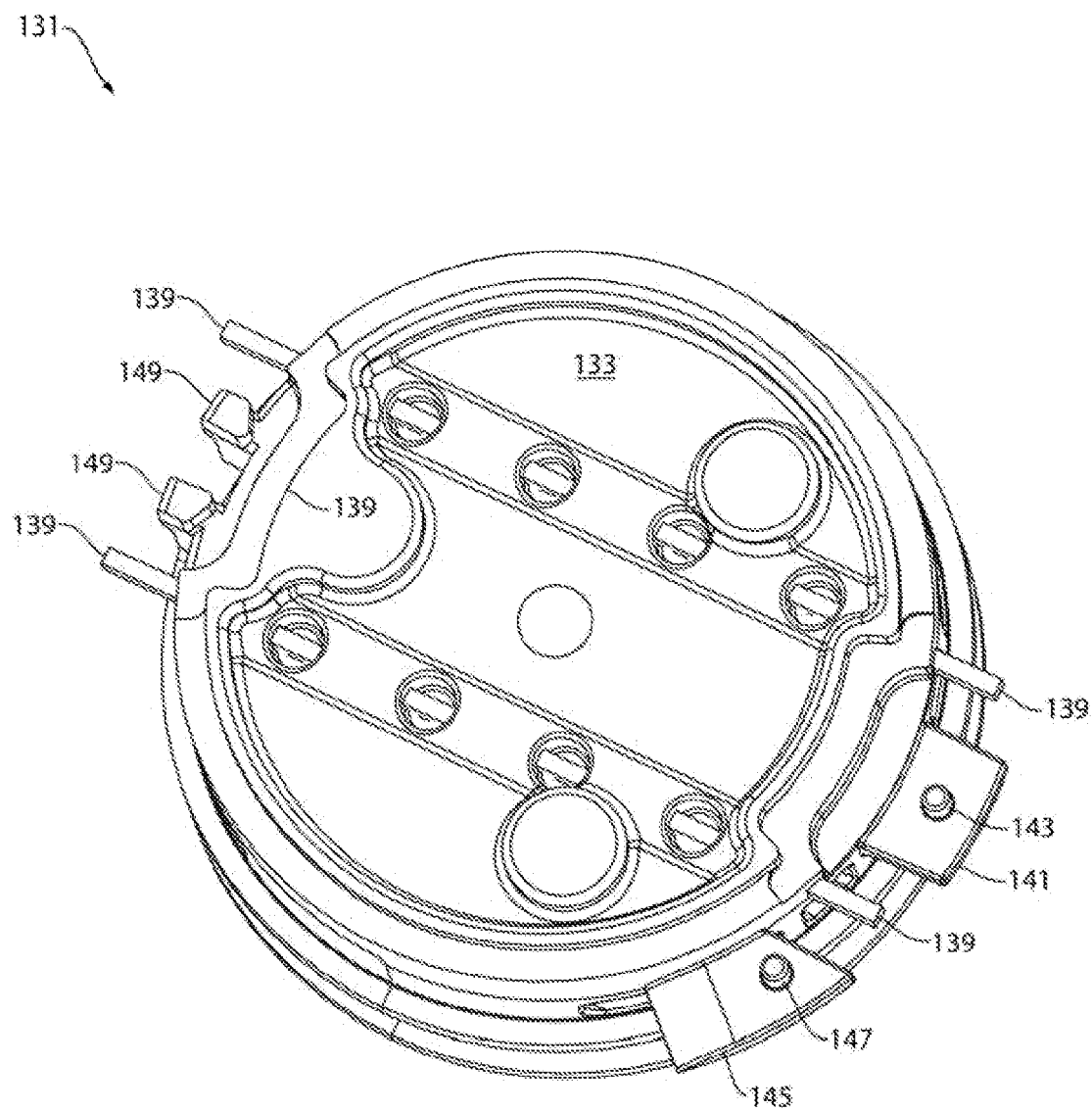
FIG. 20 is a perspective view of a voice coil made in accordance with the teachings herein, but without the wiring.
Figure 21:
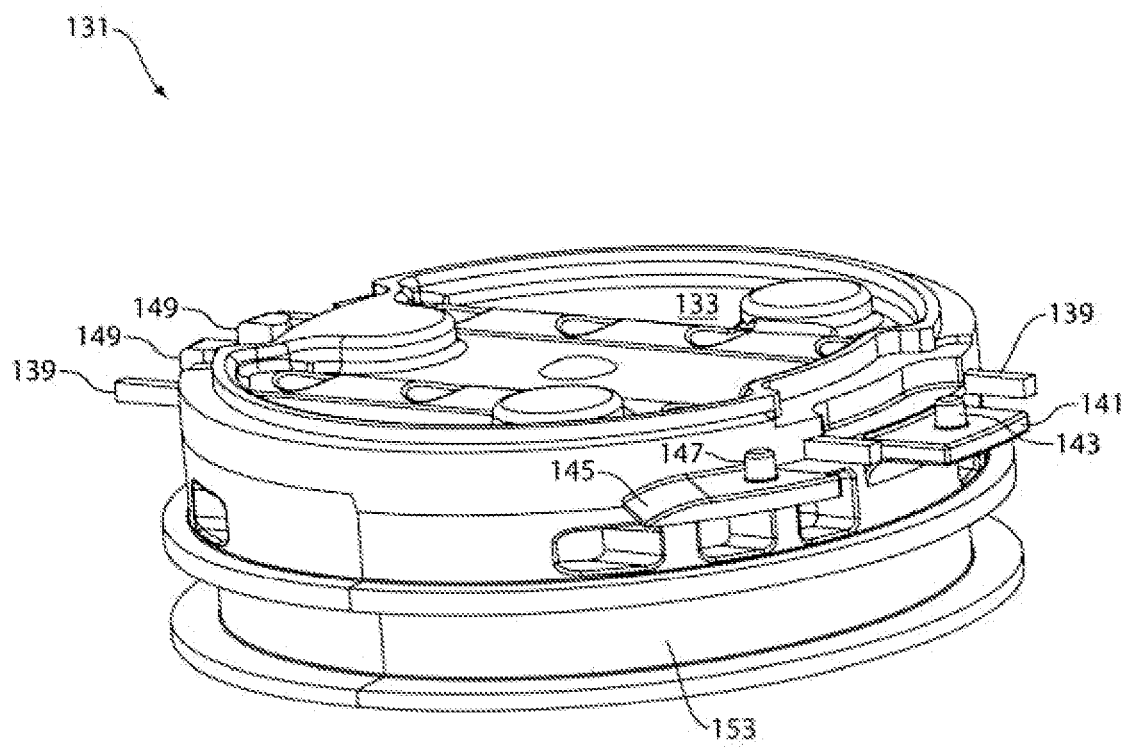
FIG. 21 is a perspective view of a voice coil made in accordance with the teachings herein, but without the wiring.
Figure 22:
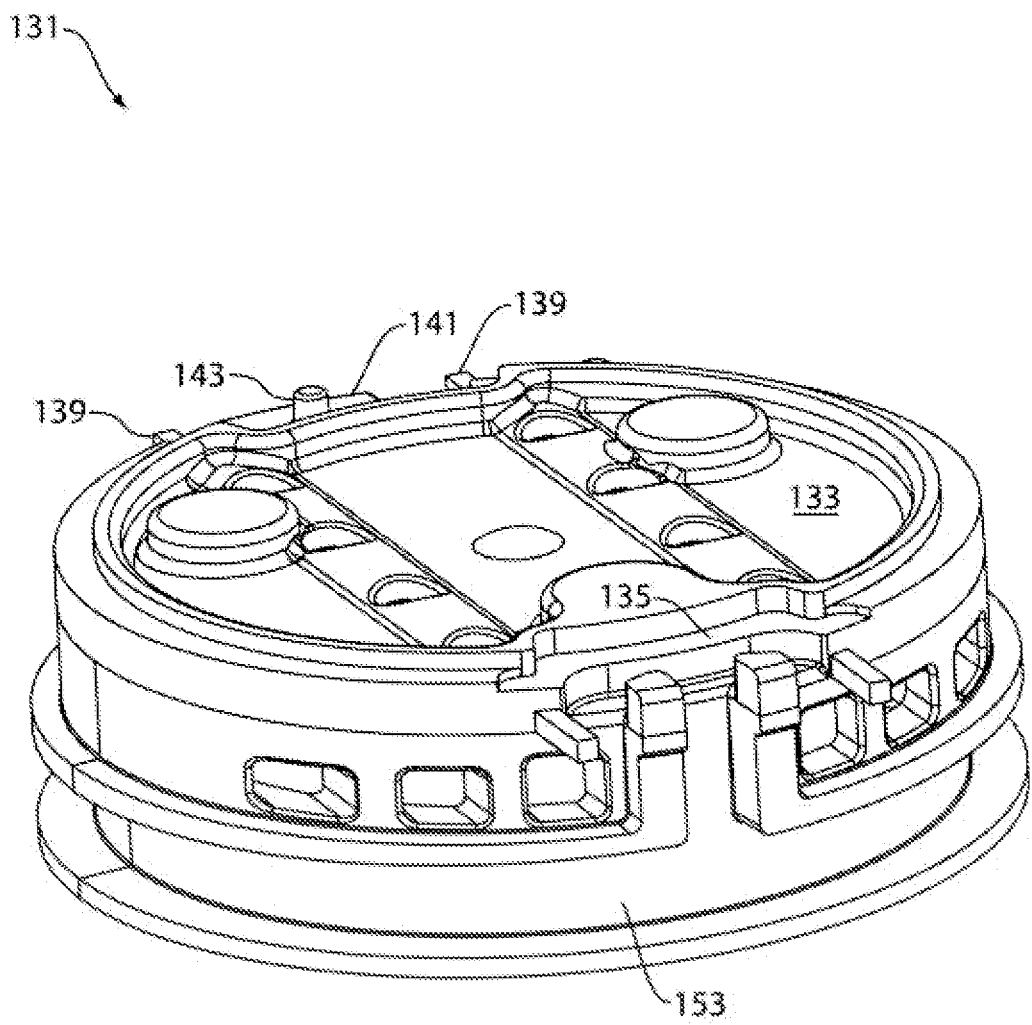
FIG. 22 is a perspective view of a voice coil made in accordance with the teachings herein, but without the wiring.
Figure 23:
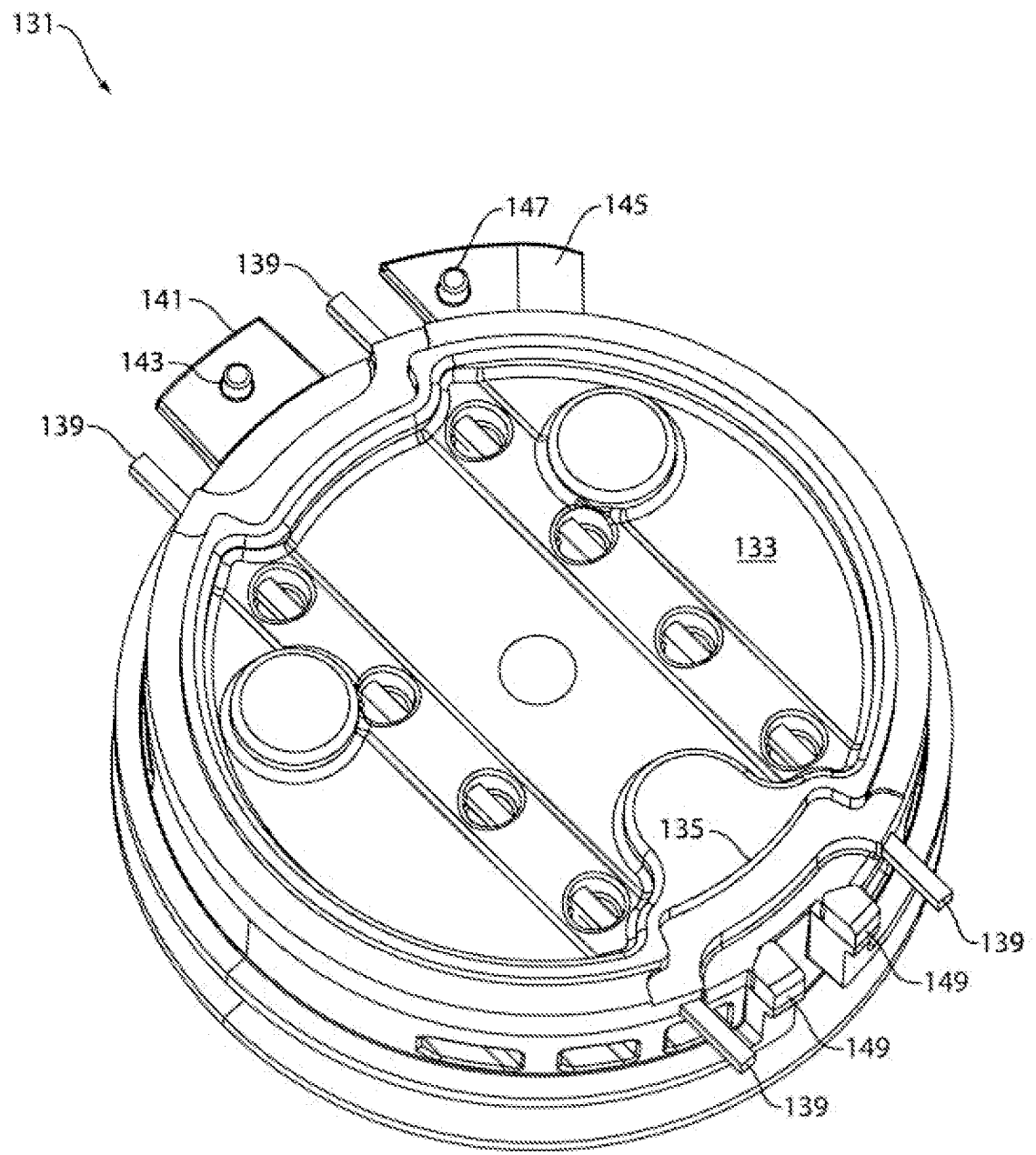
FIG. 23 is a perspective view of a voice coil made in accordance with the teachings herein, but without the wiring.
Figure 24:
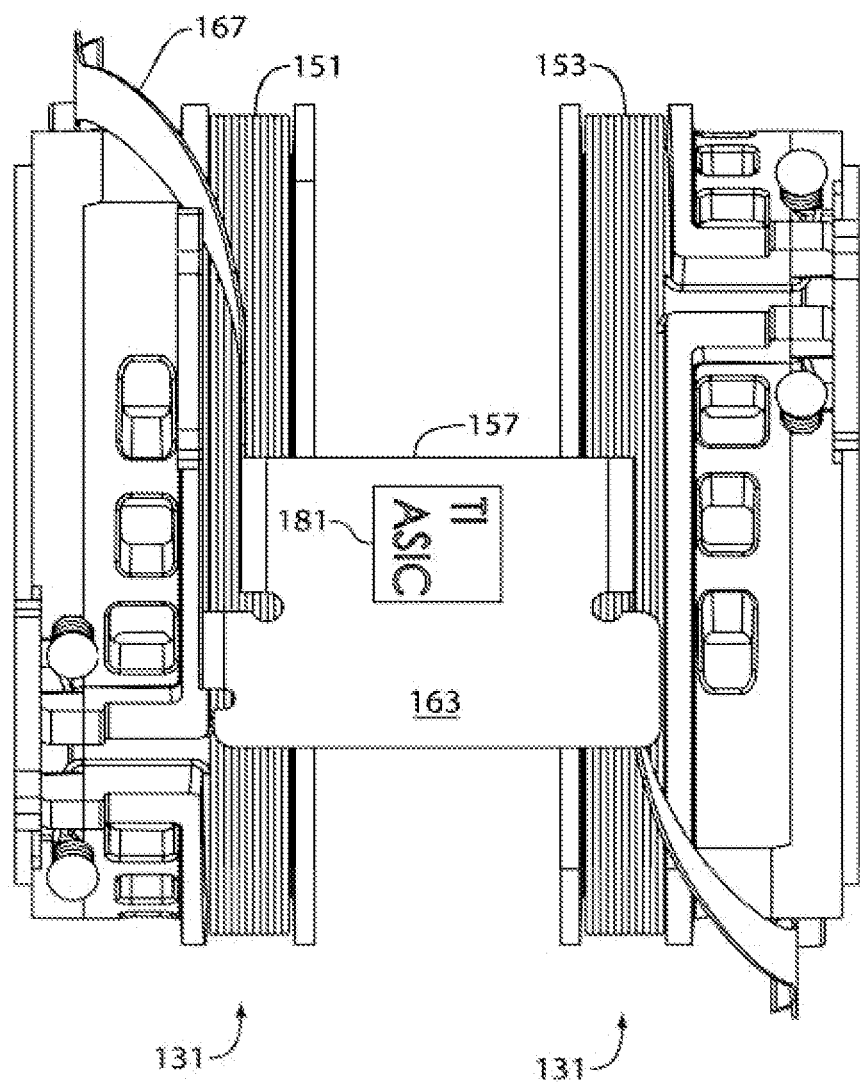
FIG. 24 is a side view of a voice coil assembly made in accordance with the teachings herein.
Figure 25:
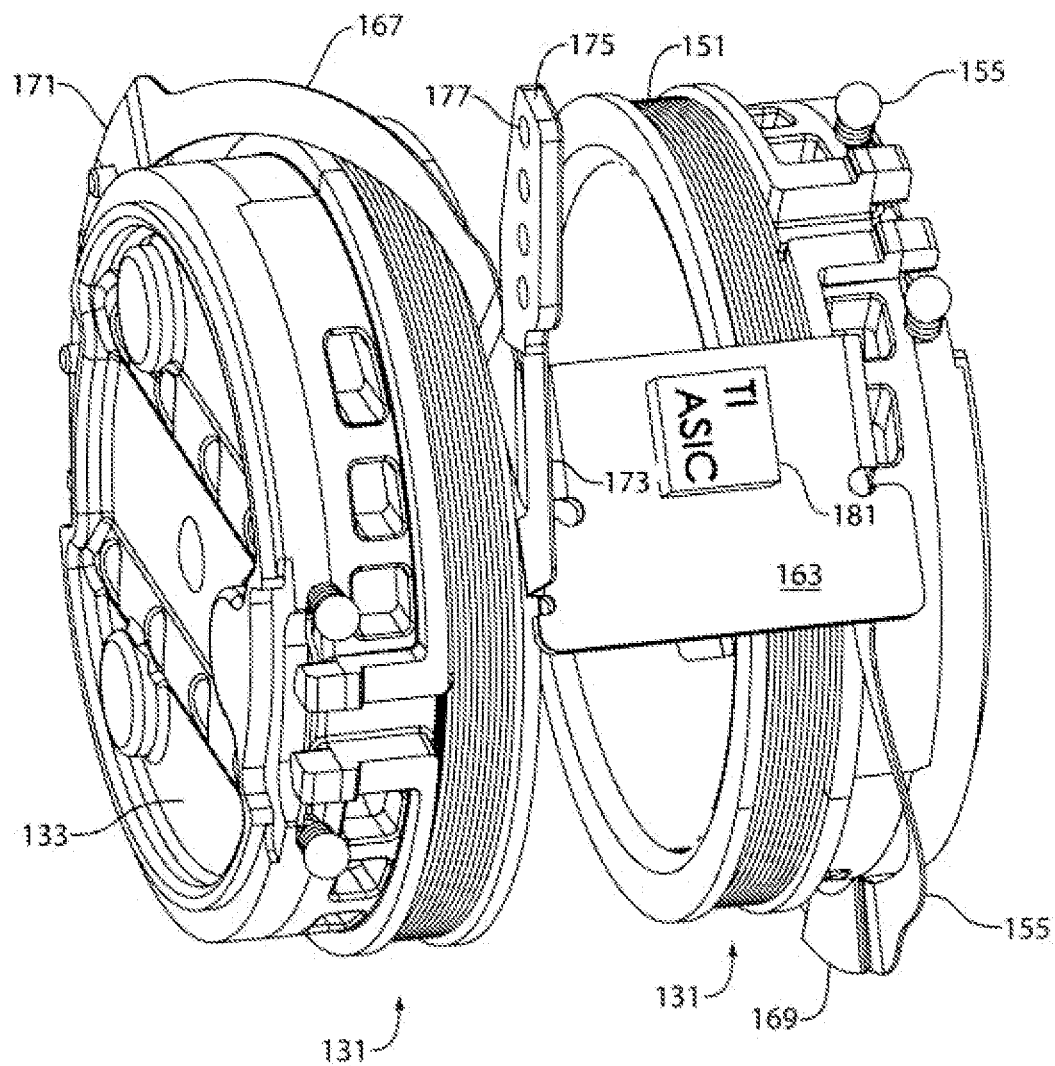
FIG. 25 is a perspective view of a voice coil assembly made in accordance with the teachings herein.

As best seen in FIG. 20, one side of the voice coil 131 is equipped with a first platform 141 which is equipped with a first protrusion 143, and a second platform 145 which is equipped with a second protrusion 147. The opposing side of each of the voice coils 131 is equipped with a pair of opposing tabs 149. The purpose of these features may be appreciated with respect to FIGS. 31-36, which depict the voice coils 131 with the electrically conductive wiring 151 of the voice coil wrapped around the spool portion 153 thereof, and FIGS. 25-30, which depict a pair of opposing voice coils 131.

As seen in FIGS. 32-35, a bulbous cap 155 is attached to the portion of the pins 139 extending adjacent to the pair of opposing tabs 149. A first end of the wiring 151 is directed through the narrow space between one of the opposing tabs 149 and the body of the voice coil 131, and is wrapped around the protruding portion of the pin 139 adjacent to the bulbous cap 155. The second end of the wiring 151 is wrapped around the second pin 139 in a similar manner. This configuration ensures that the wiring 151 is maintained in a proper state of tension at all times and is in electrical communication with the pins 139.

Figure 9:
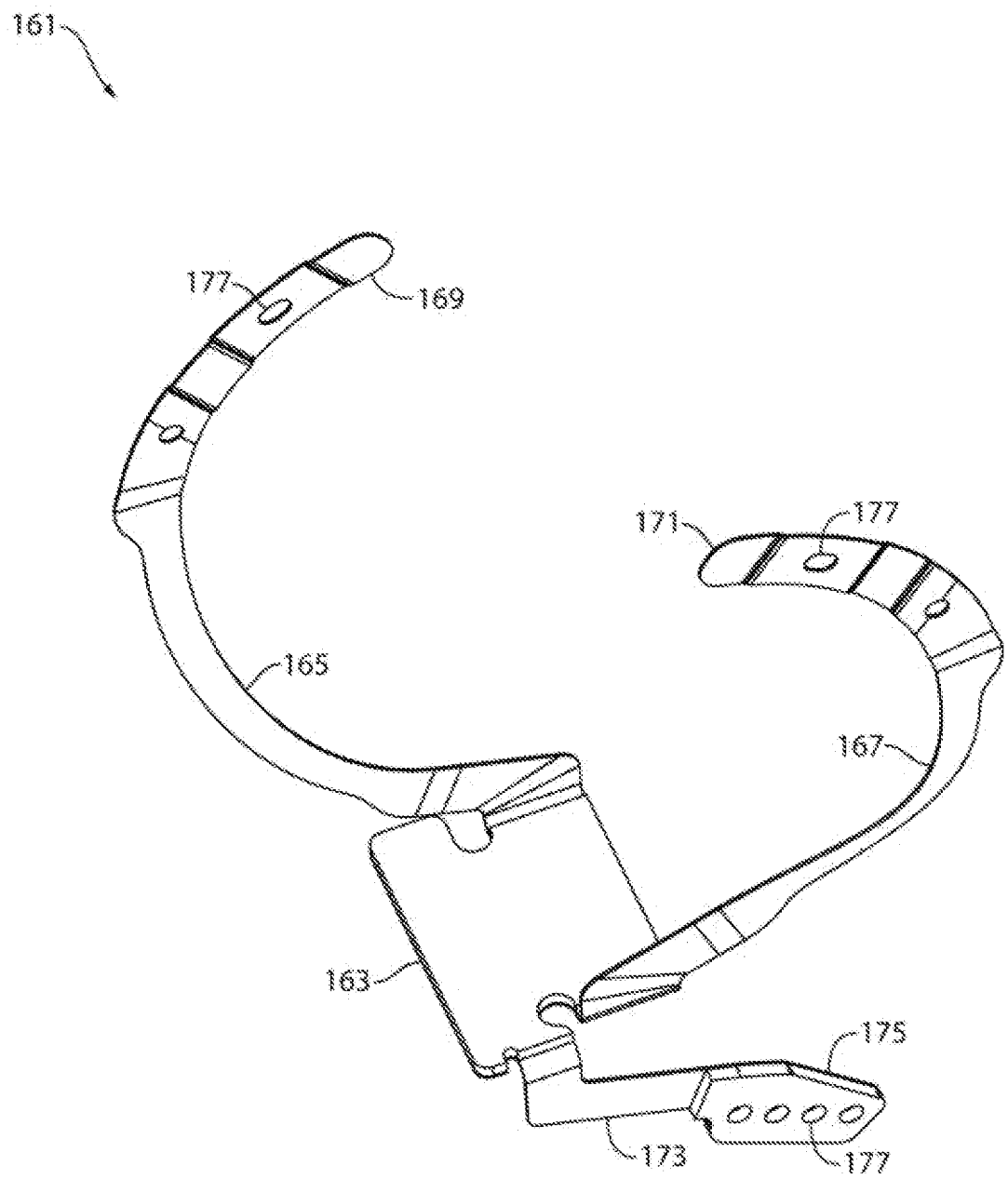
FIG. 9 is a perspective view of a flexible, electrically conductive connector made in accordance with the teachings herein.
Figure 10:
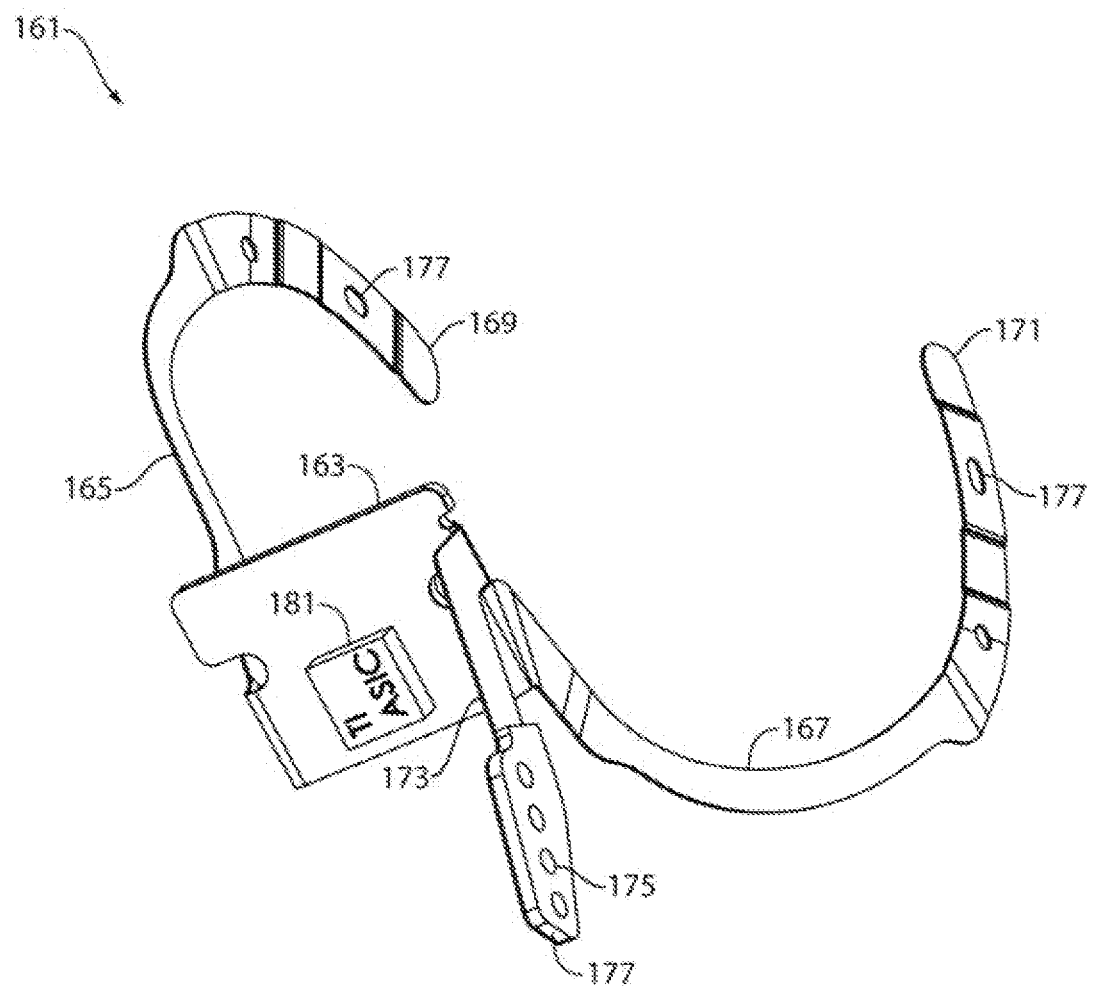
FIG. 10 is a perspective view of a flexible, electrically conductive connector made in accordance with the teachings herein.
Figure 11:
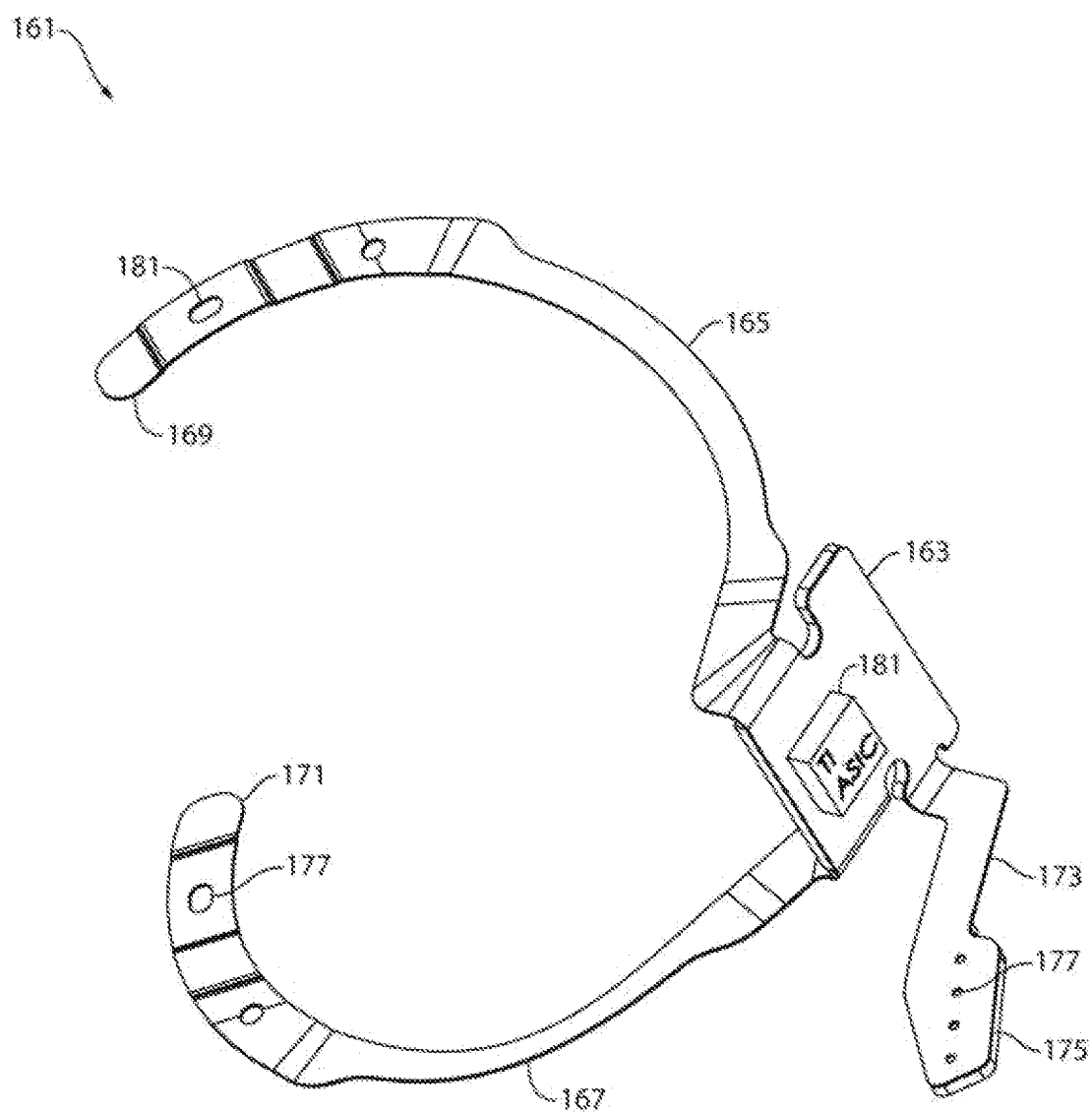
FIG. 11 is a perspective view of a flexible, electrically conductive connector made in accordance with the teachings herein.
Figure 12:
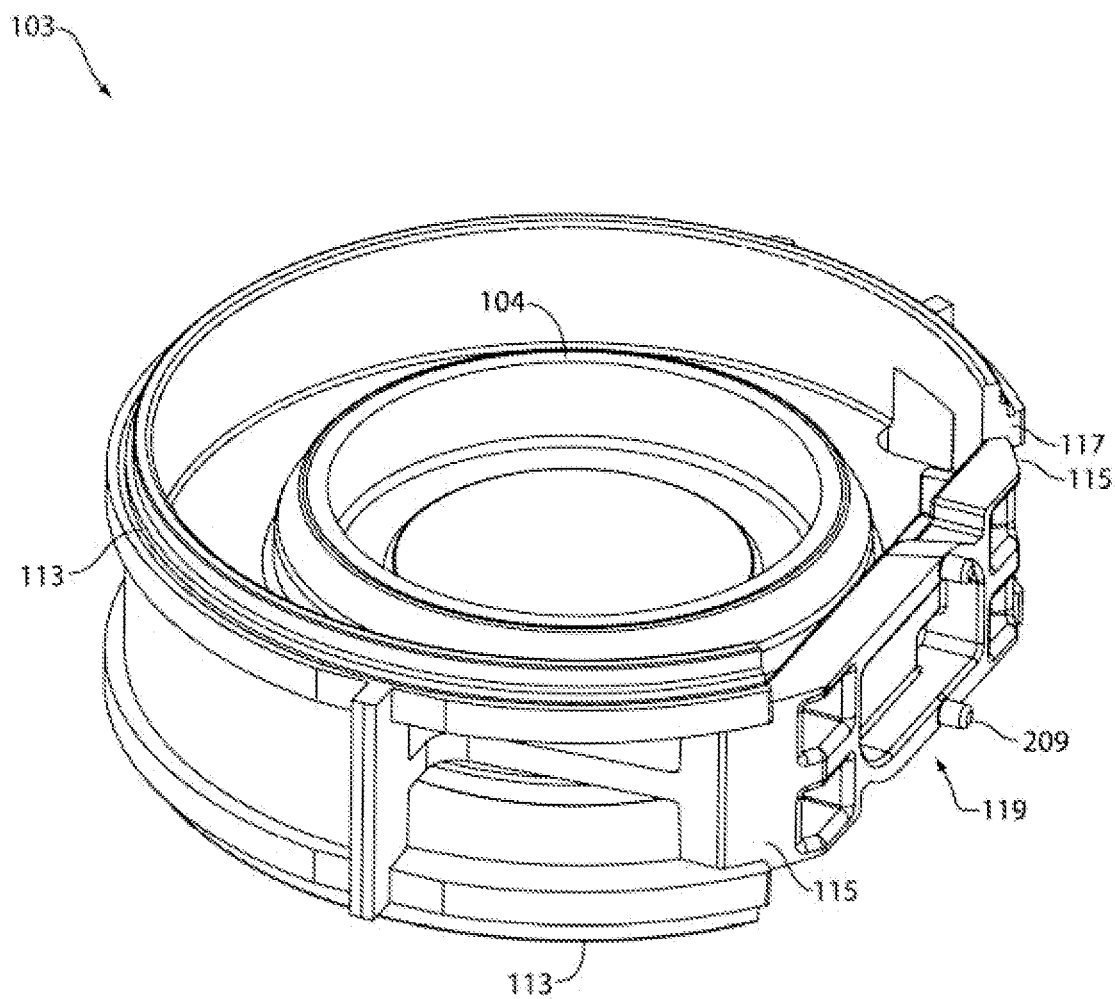
FIG. 12 is a perspective view of the main chassis of a synthetic jet actuator made in accordance with the teachings herein.
Figure 13:
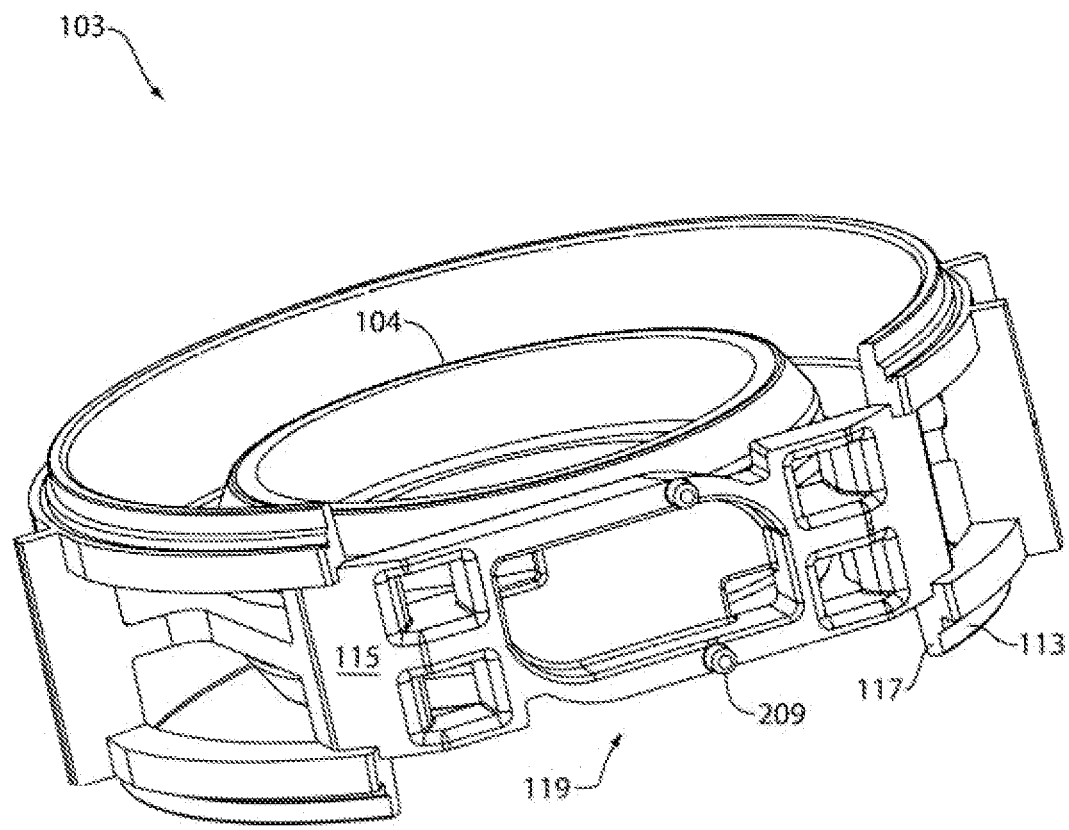
FIG. 13 is a perspective view of the main chassis of a synthetic jet actuator made in accordance with the teachings herein.
Figure 14:
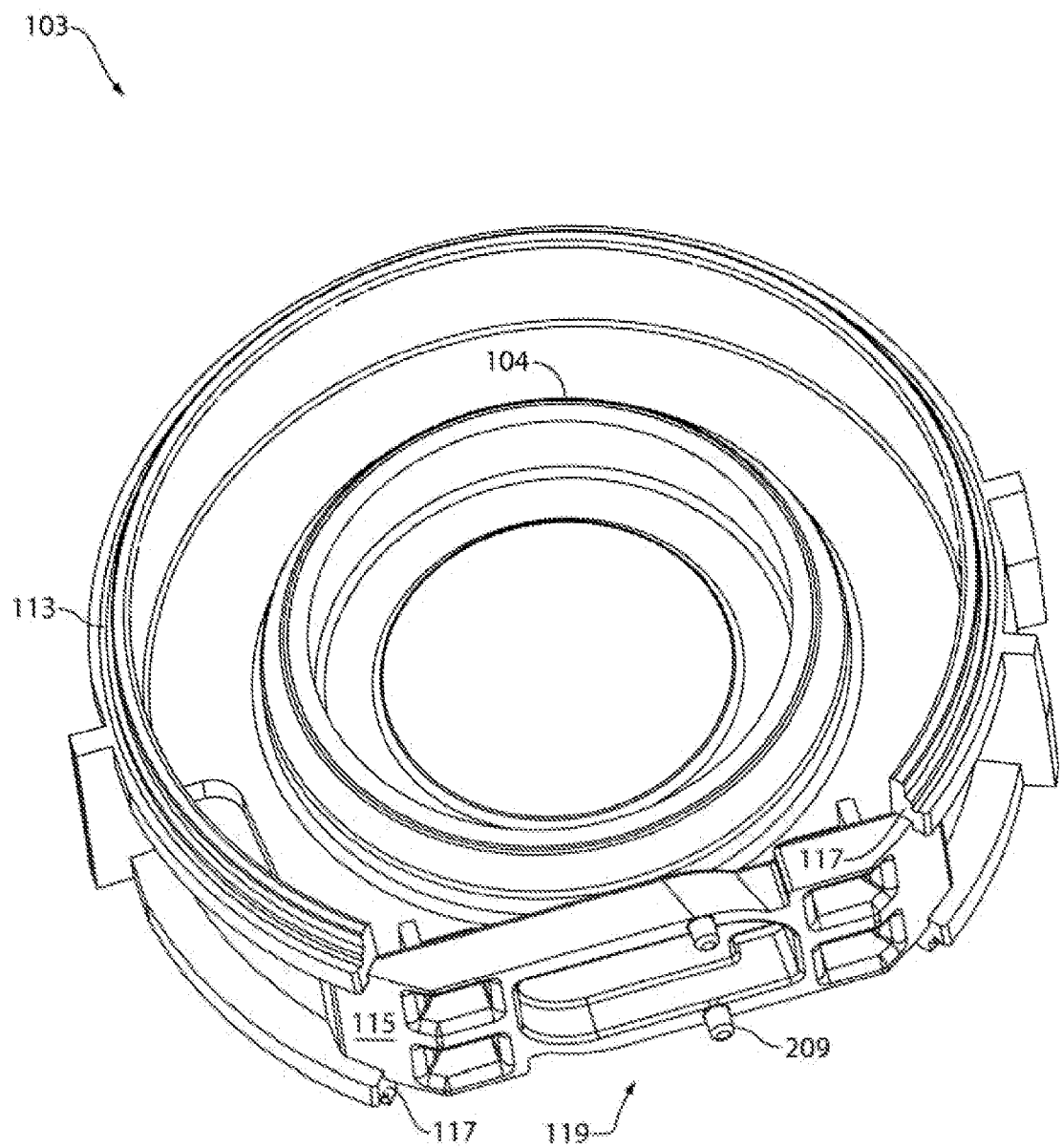
FIG. 14 is a perspective view of the main chassis of a synthetic jet actuator made in accordance with the teachings herein.
Figure 15:
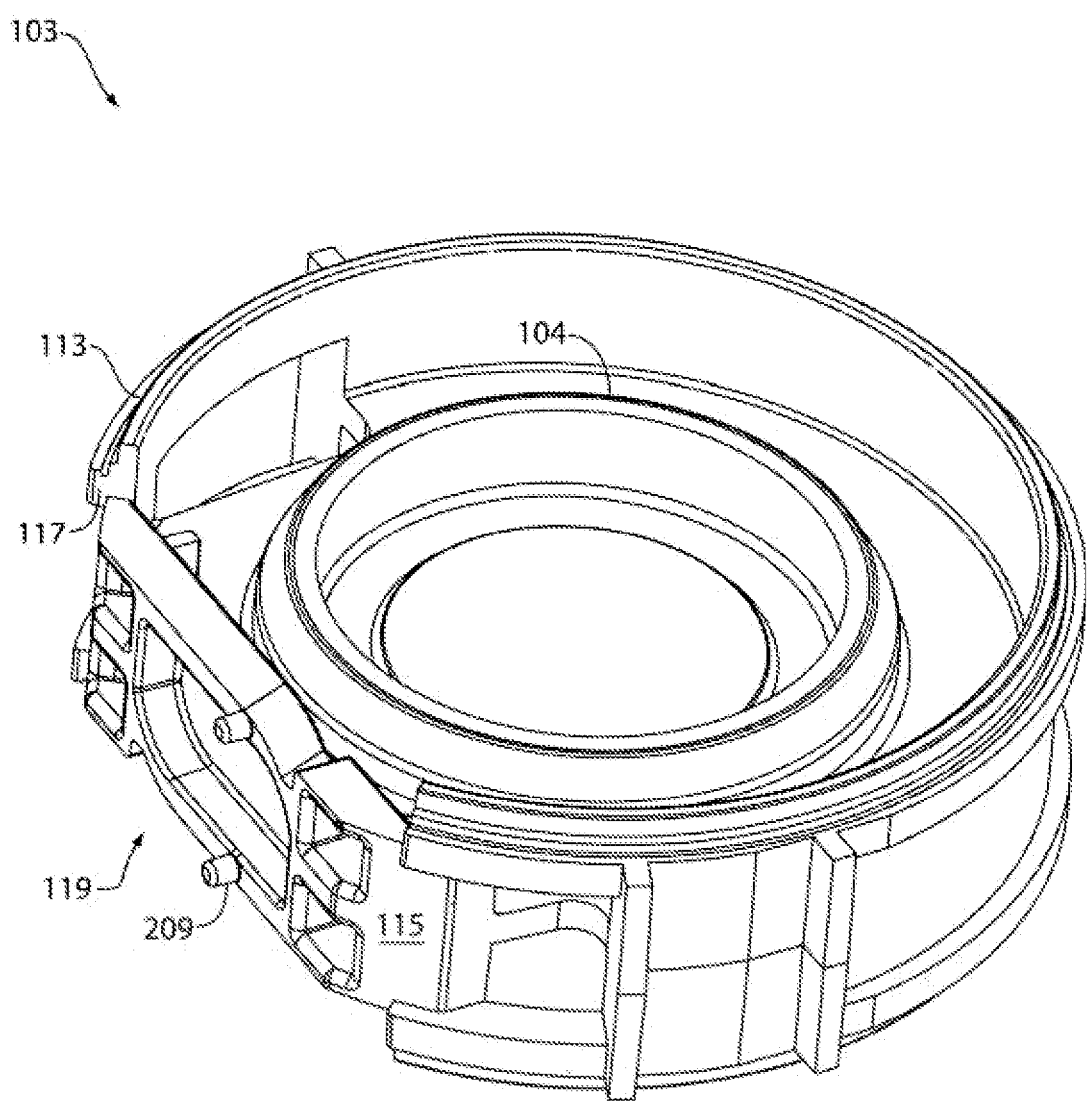
FIG. 15 is a perspective view of the main chassis of a synthetic jet actuator made in accordance with the teachings herein.
Figure 16:
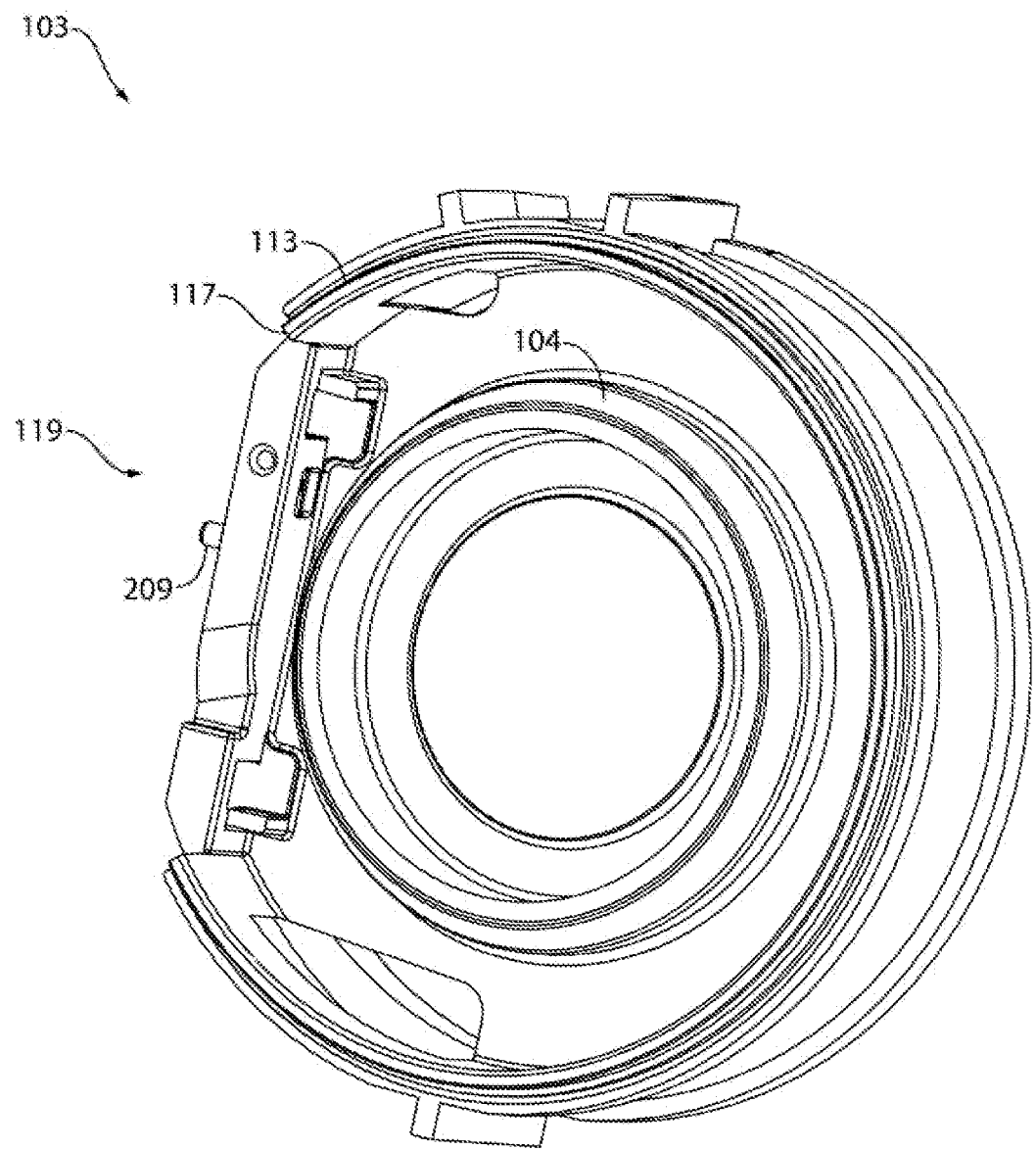
FIG. 16 is a perspective view of the main chassis of a synthetic jet actuator made in accordance with the teachings herein.
Figure 17:
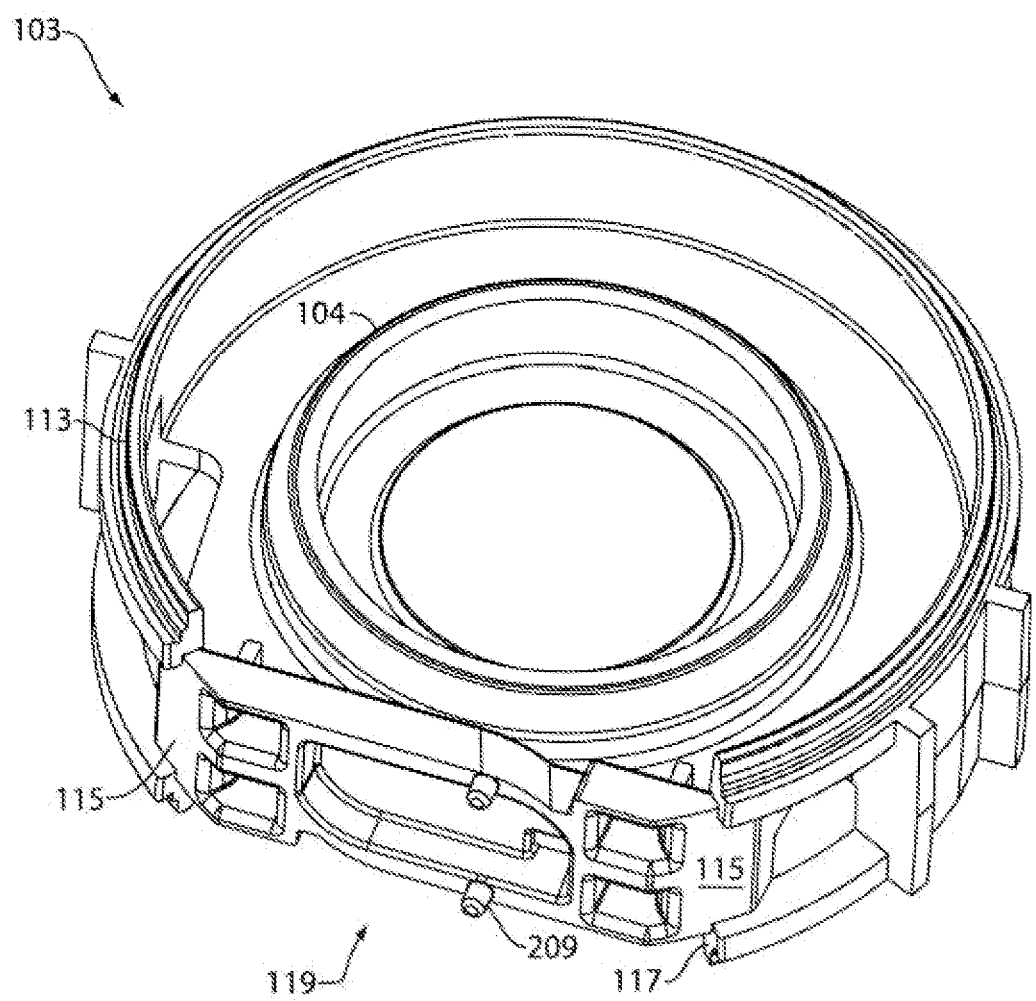
FIG. 17 is a perspective view of the main chassis of a synthetic jet actuator made in accordance with the teachings herein.
Figure 18:
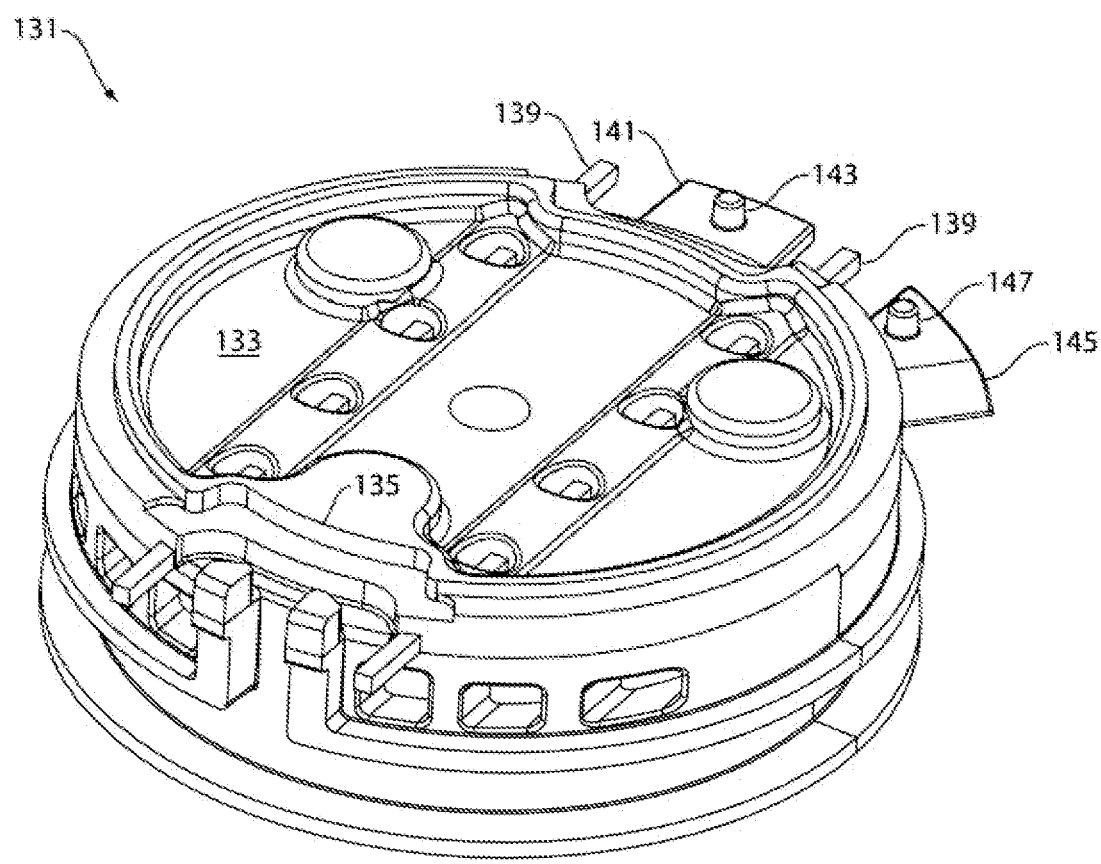
FIG. 18 is a perspective view of a voice coil made in accordance with the teachings herein, but without the wiring.
Figure 19:
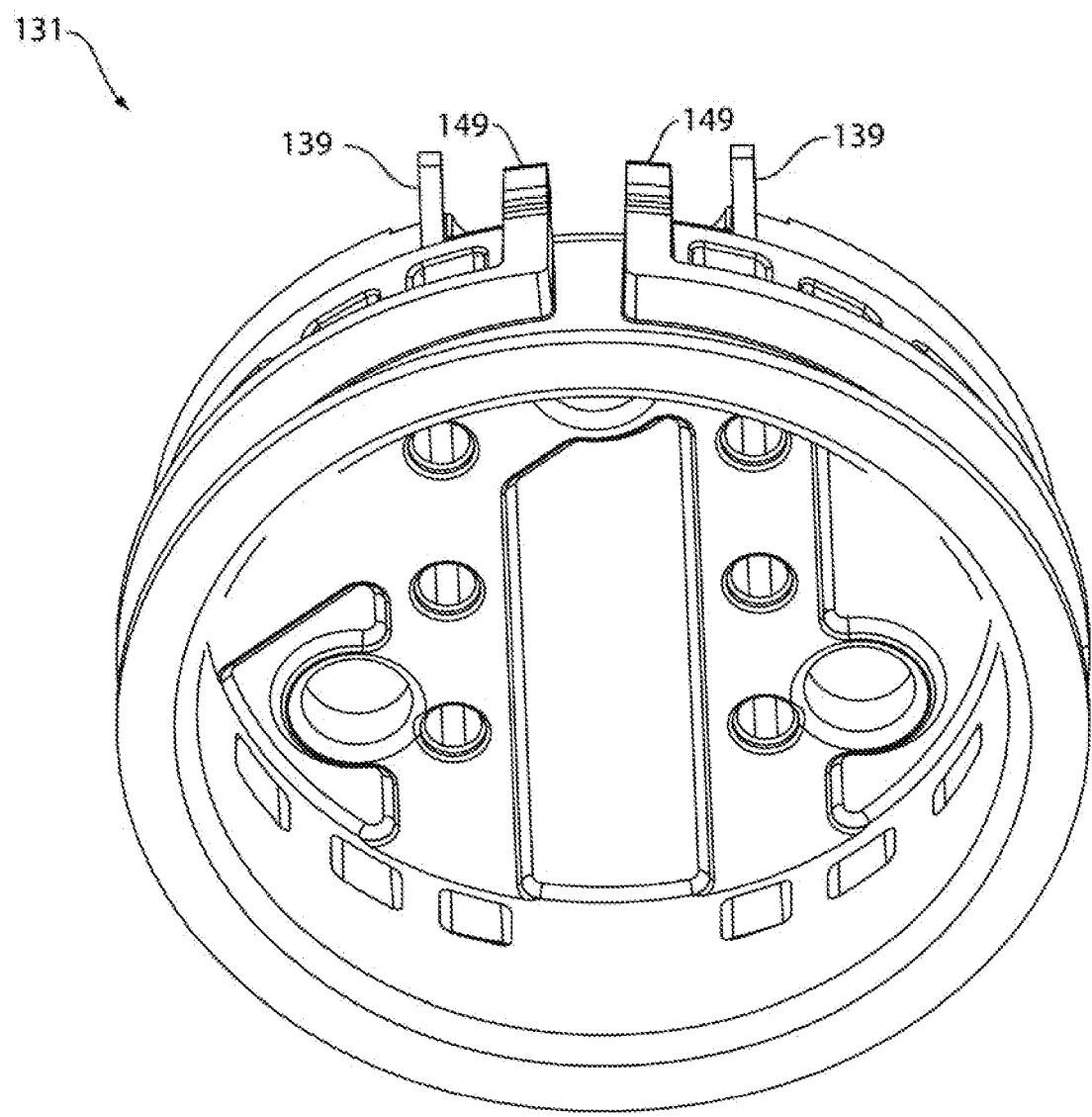
FIG. 19 is a perspective view of a voice coil made in accordance with the teachings herein, but without the wiring.

Referring now to FIGS. 9-11, a flexible, electrically conductive connector 161 is provided which provides electrical connectivity between an external source of power (not shown) and the internal circuitry of the synthetic jet actuator 101. The placement of the connector 161 is depicted in FIGS. 24-29.

As seen in FIGS. 9-11, the connector 161 comprises a central portion 163 having first 165 and second 167 arms extending therefrom which terminate in first 169 and second 171 terminal portions, respectively, and a third arm 173 which terminates in a third terminal portion 175. The first 169 and second 171 terminal portions are essentially mirror images of each other and are provided with a series of apertures 177 therein. The third terminal portion 175 is also provided with a series of apertures 177. As best seen in FIGS. 10-11, the central portion 163 is equipped with a semiconductor chip 181 or other control device which controls the operation of the synthetic jet actuator 101.

The connector 161 is preferably cut or stamped from a single piece of a flexible, conductive material, and is even more preferably made using flexible electronics technology (also known as flex circuitry). Thus, for example, the connector 161 may be constructed by forming suitable circuitry for the connector 161 on a flexible plastic substrate such as a film of polyimide or PEEK (polyether ether ketone), or by screen printing the circuitry using a suitable metal (such as silver) on a polyester substrate. The central portion 163 and the third terminal portion 175 preferably have an additional layer of plastic or some other suitably rigid material laminated or adhered to them to increase the rigidity of these components.

Figure 26:
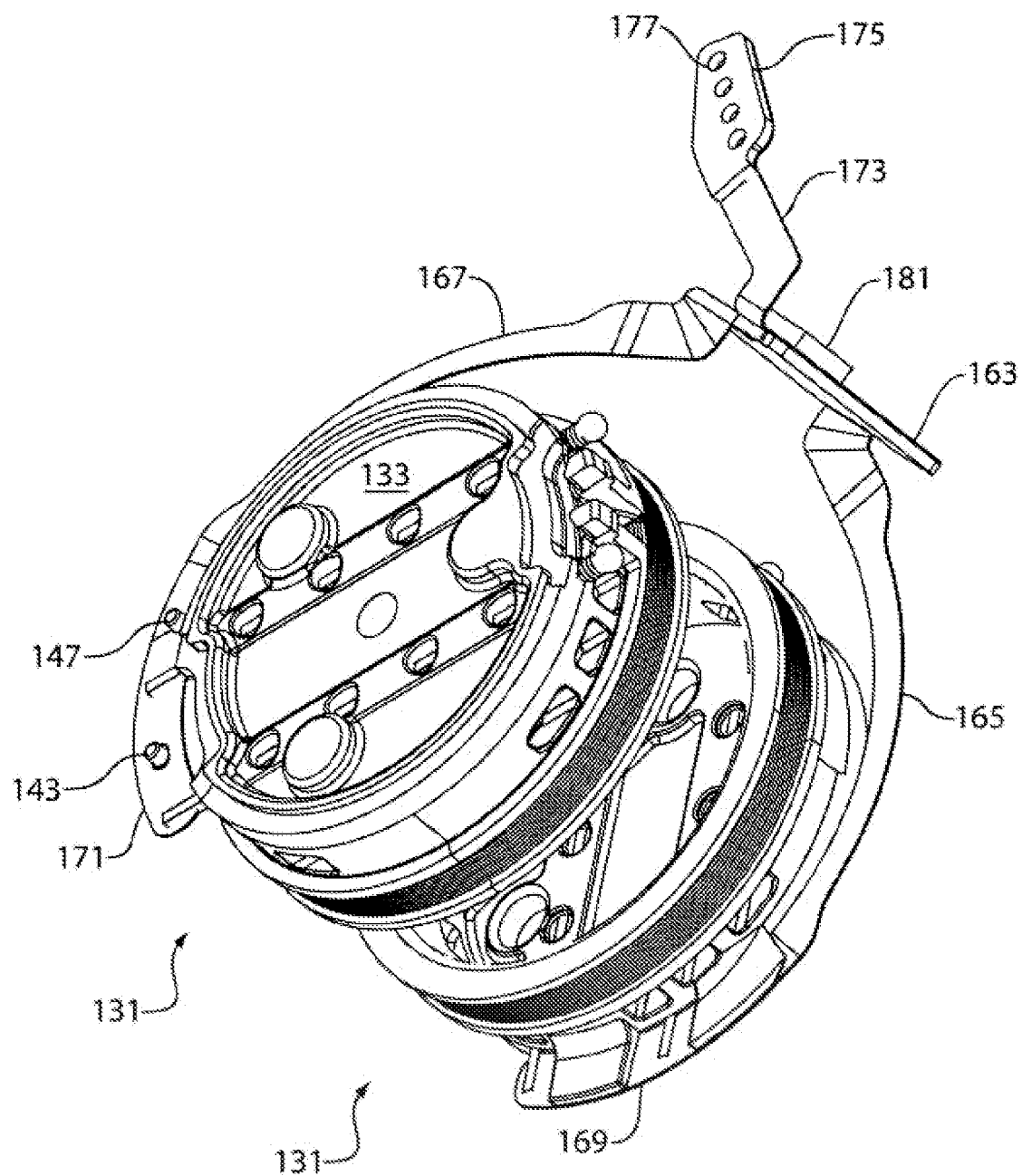
FIG. 26 is a perspective view of a voice coil assembly made in accordance with the teachings herein.
Figure 27:
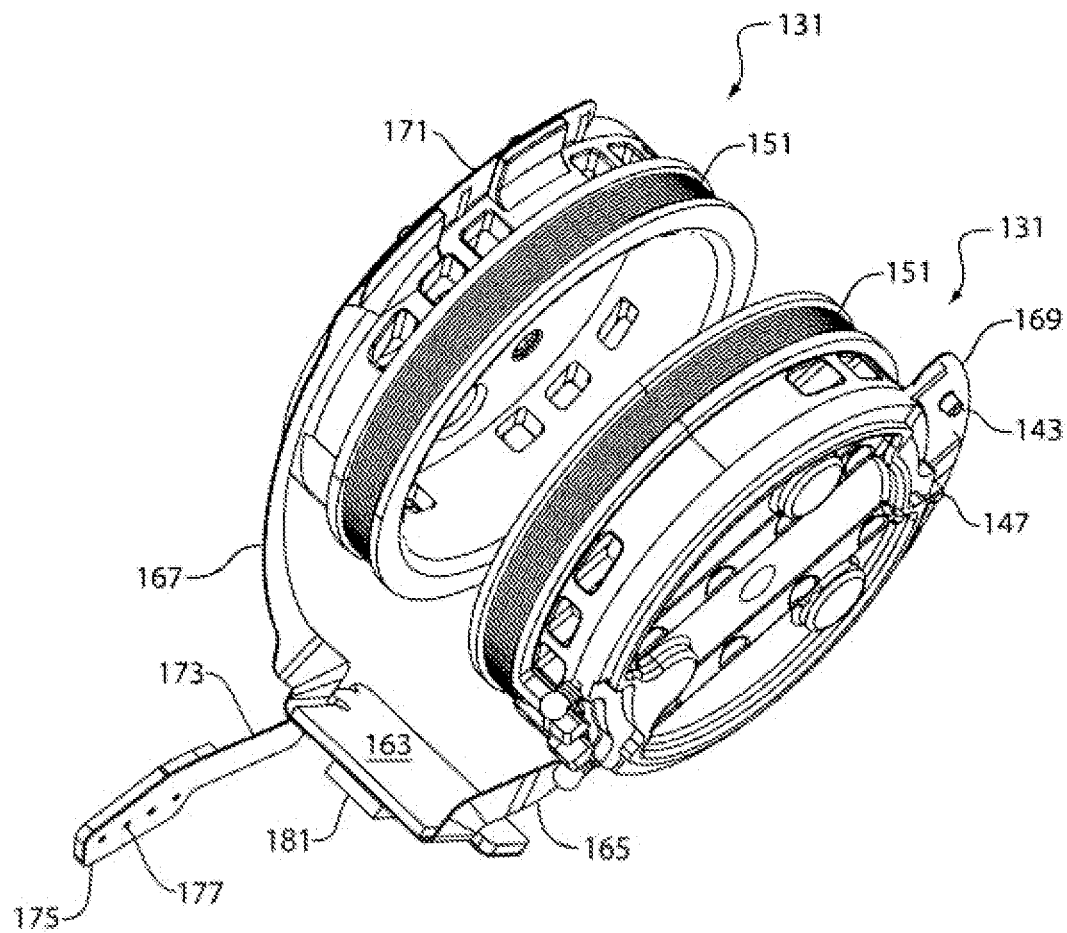
FIG. 27 is a perspective view of a voice coil assembly made in accordance with the teachings herein.
Figure 28:
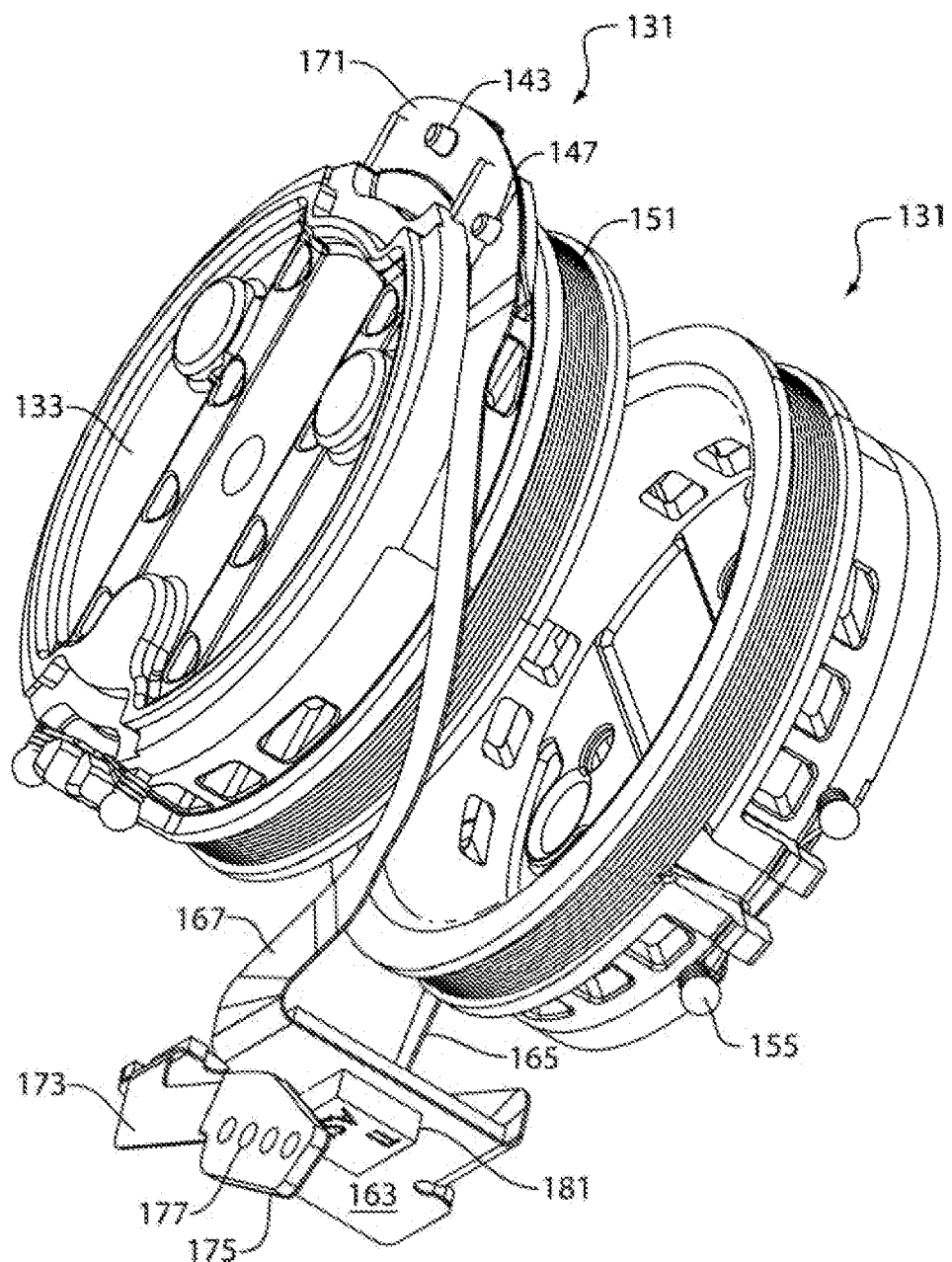
FIG. 28 is a perspective view of a voice coil assembly made in accordance with the teachings herein.
Figure 29:
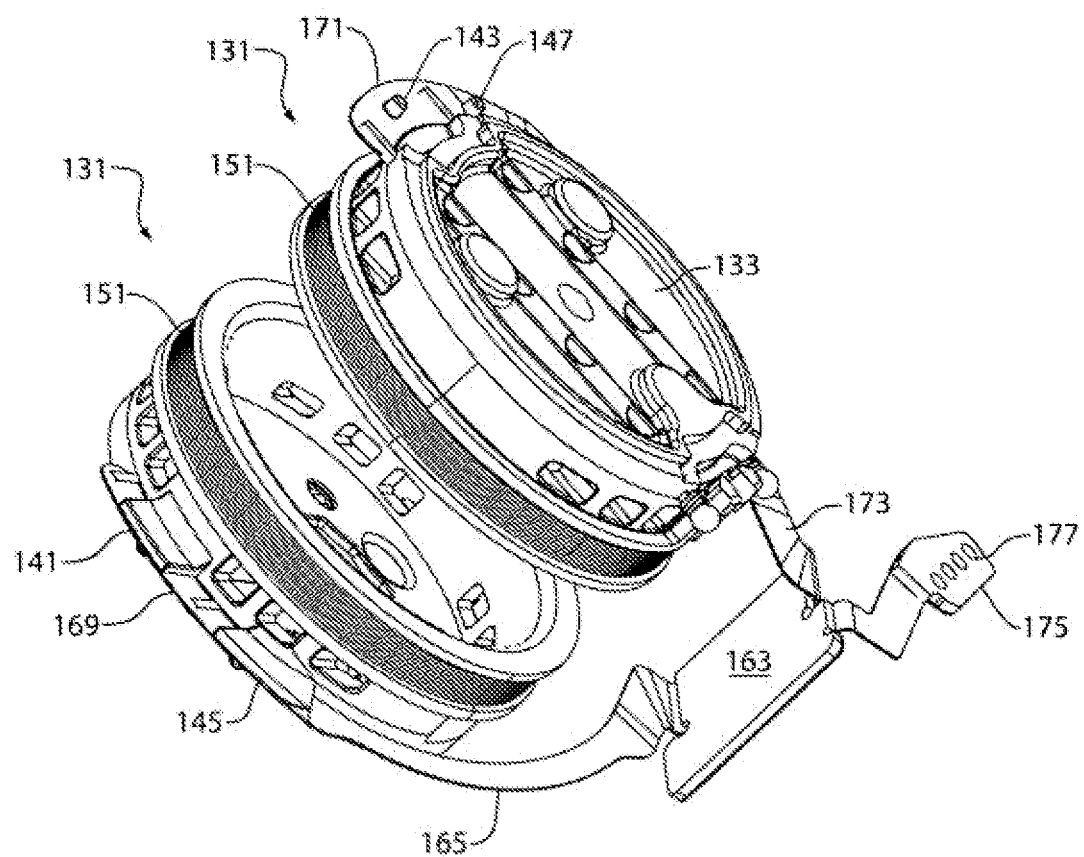
FIG. 29 is a perspective view of a voice coil assembly made in accordance with the teachings herein.
Figure 30:
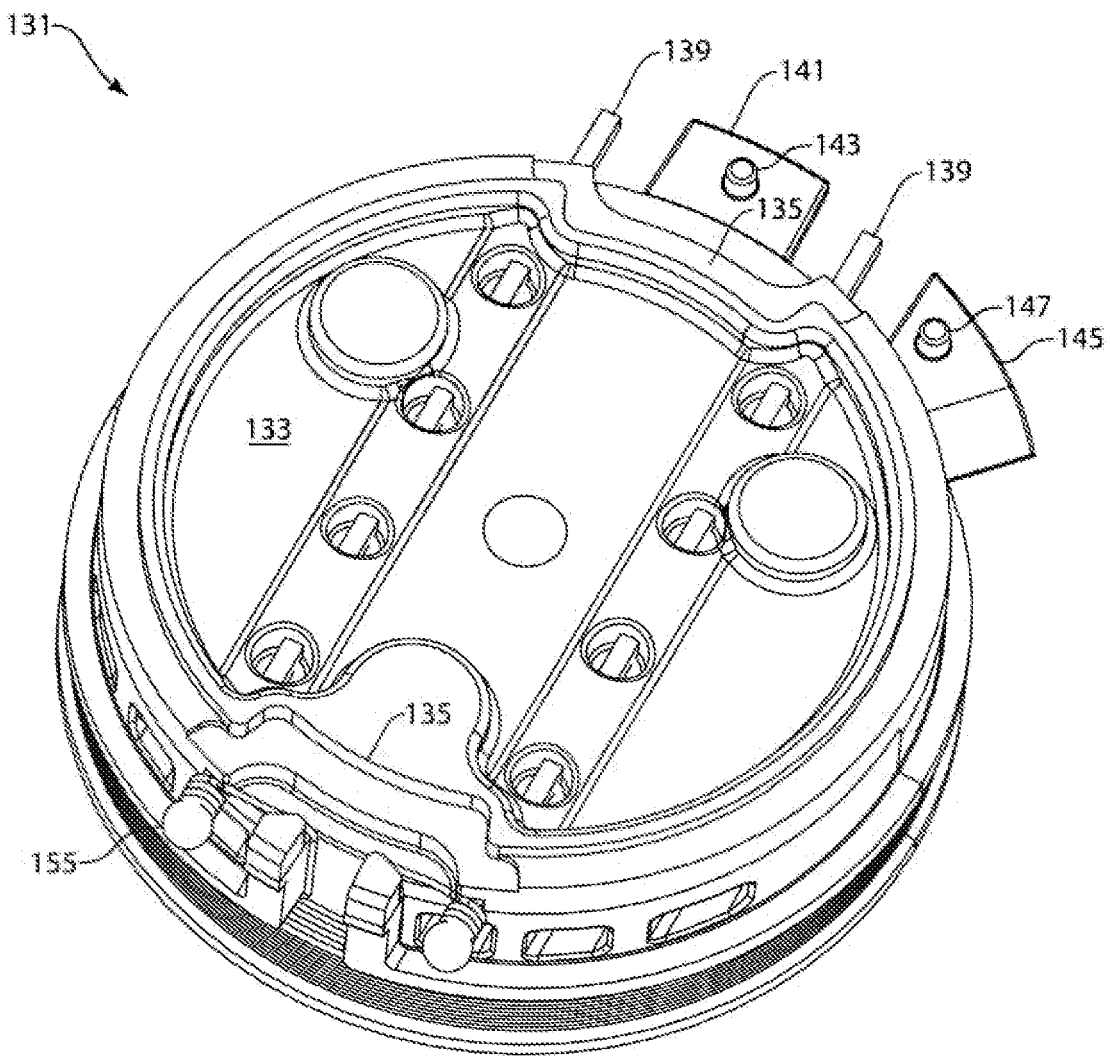
FIG. 30 is a perspective view of a voice coil made in accordance with the teachings herein.
Figure 31:
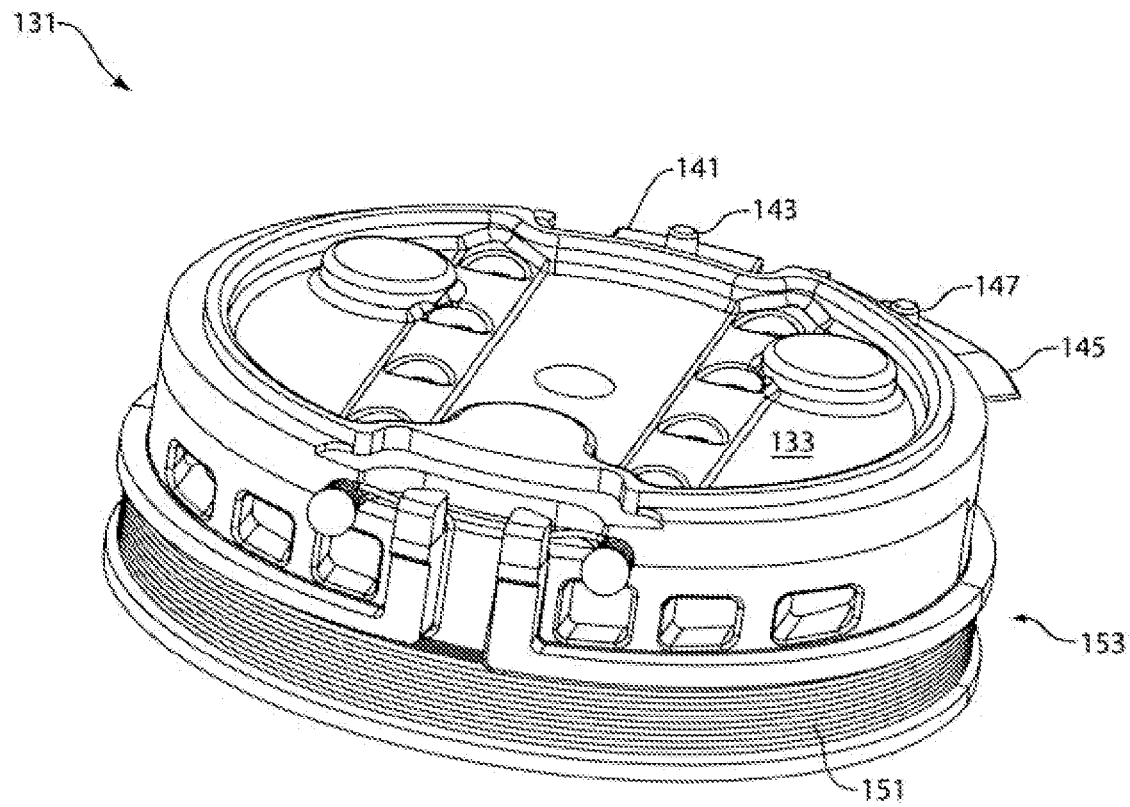
FIG. 31 is a perspective view of a voice coil made in accordance with the teachings herein.
Figure 32:
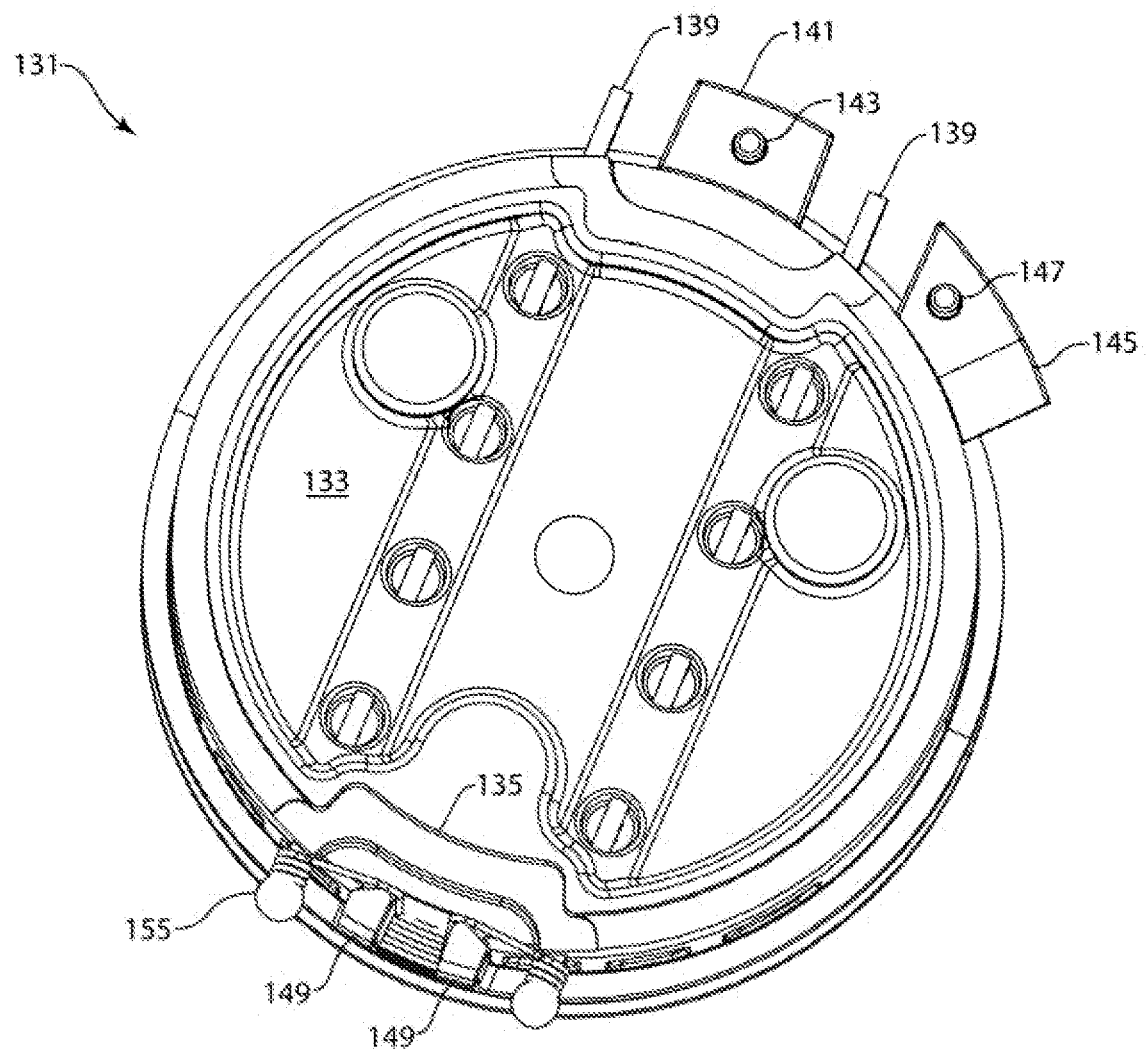
FIG. 32 is a perspective view of a voice coil made in accordance with the teachings herein.
Figure 33:
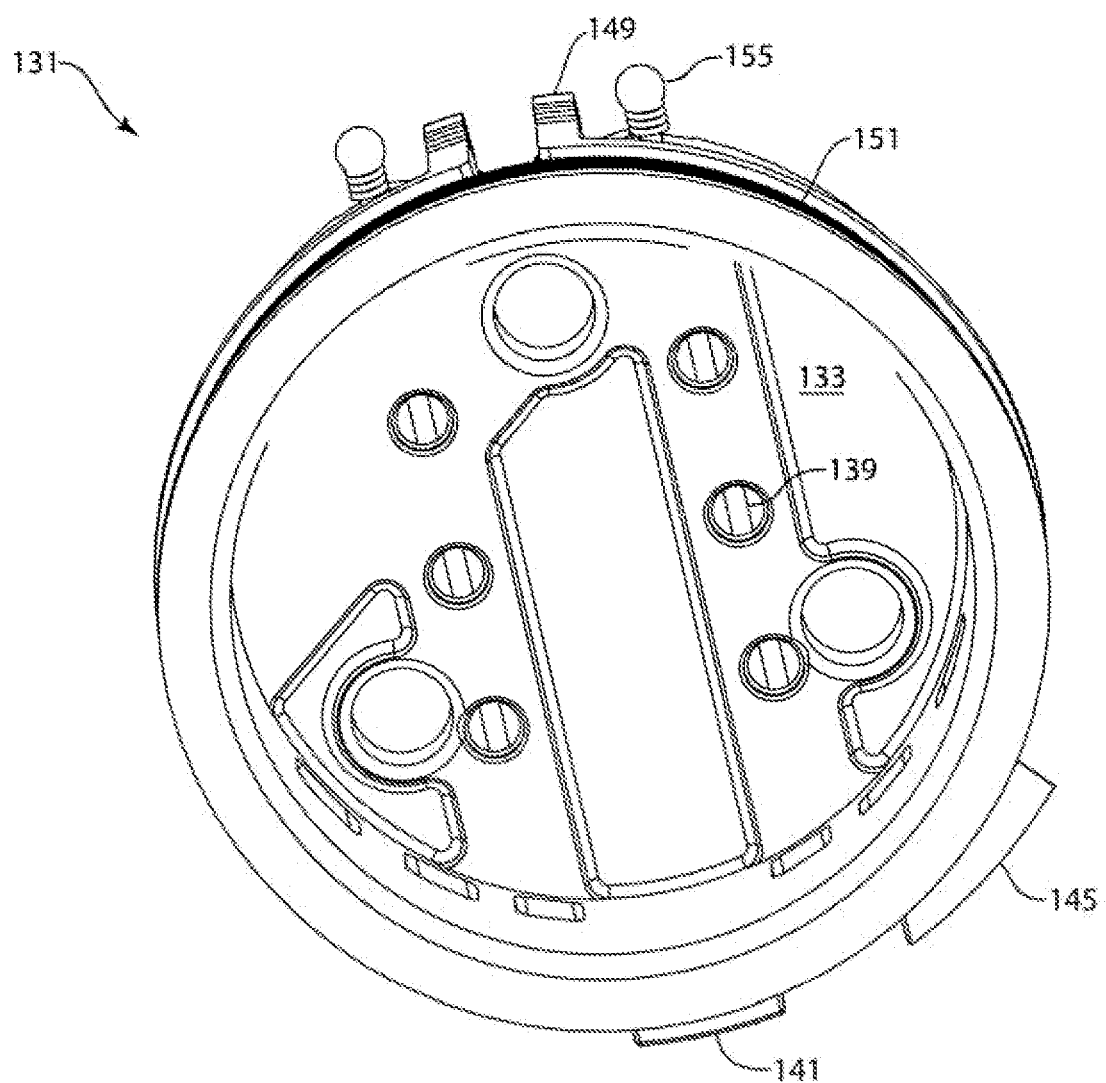
FIG. 33 is a perspective view of a voice coil made in accordance with the teachings herein.
Figure 34:
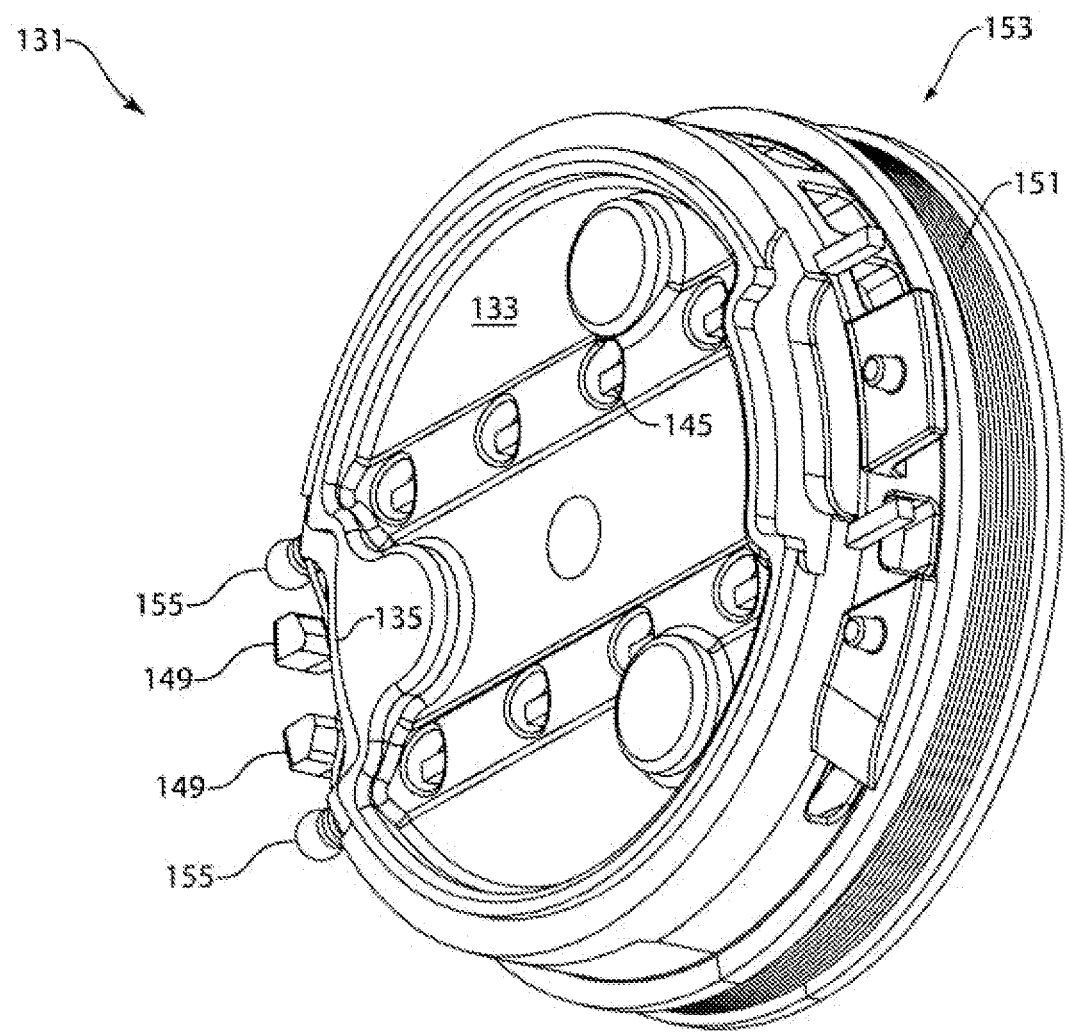
FIG. 34 is a perspective view of a voice coil made in accordance with the teachings herein.
Figure 35:
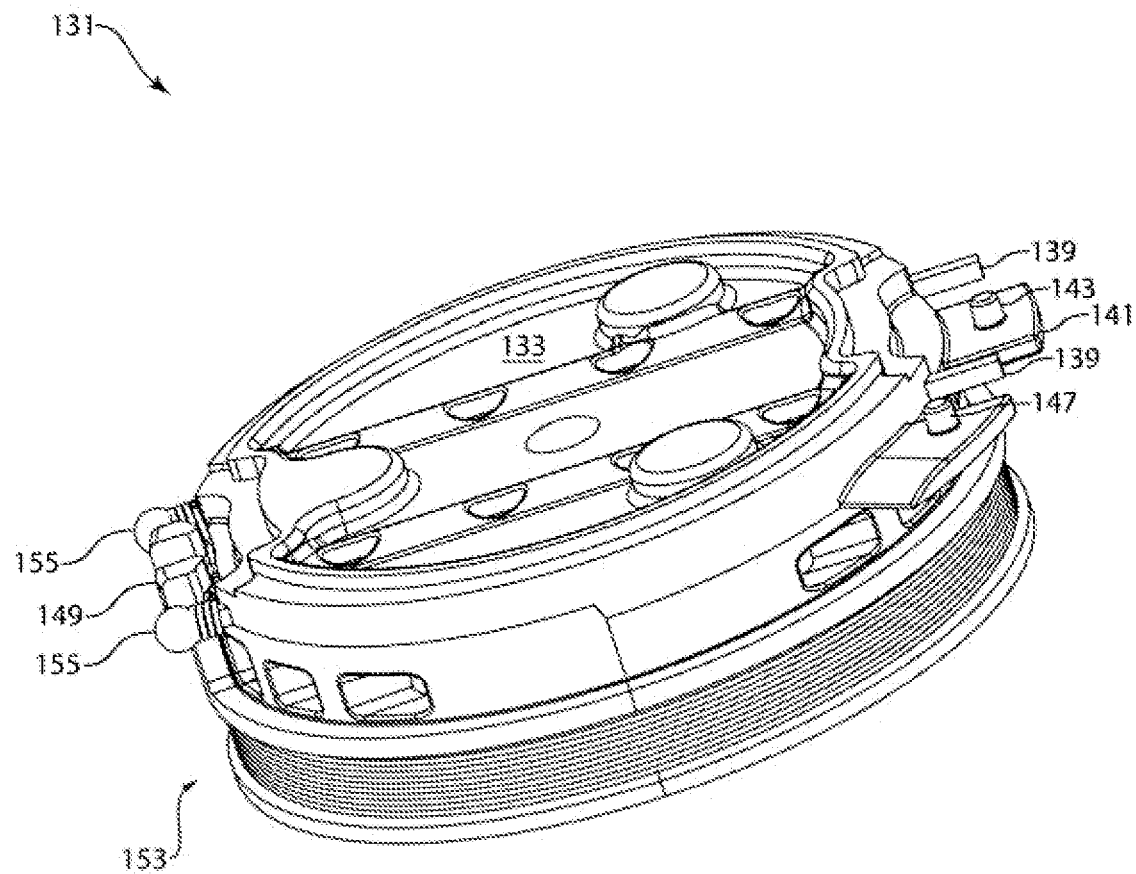
FIG. 35 is a perspective view of a voice coil made in accordance with the teachings herein.
Figure 36:
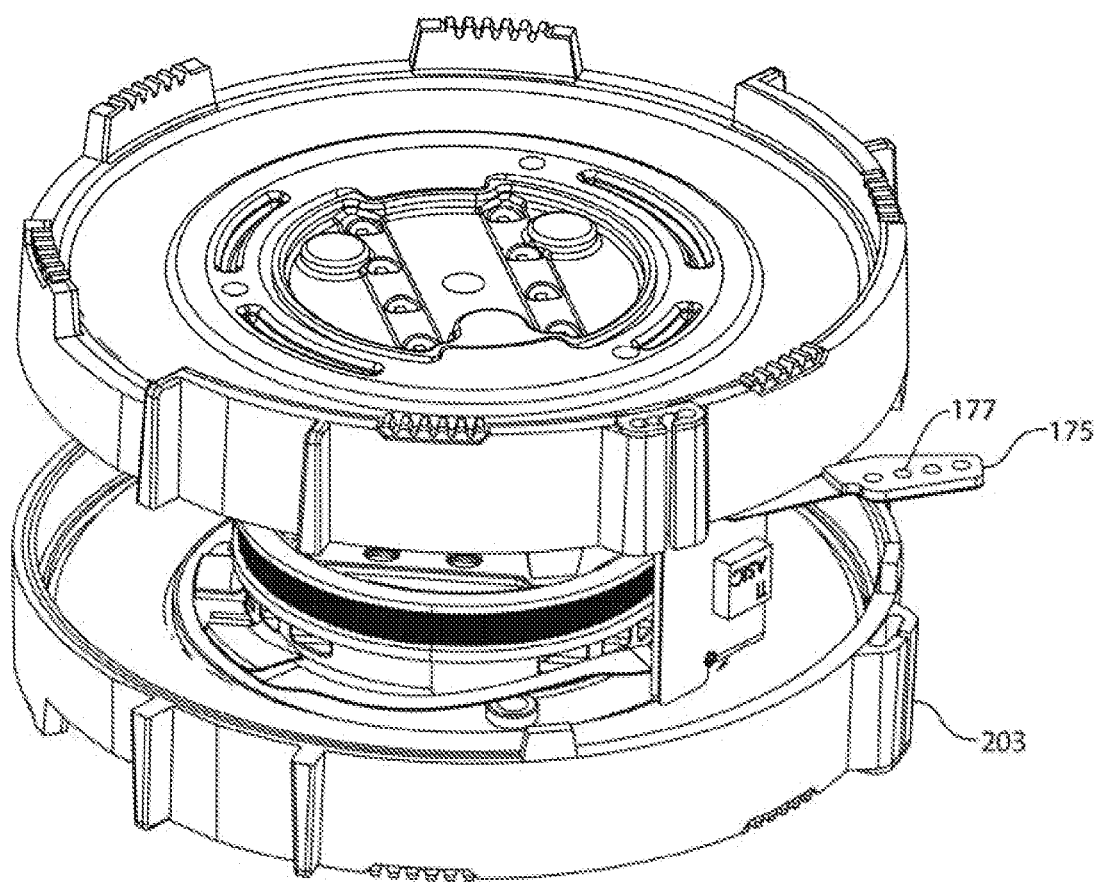
FIG. 36 is a perspective view of the synthetic jet actuator of FIG. 1 with the main chassis removed to show the details of the interior of the device.
Figure 37:
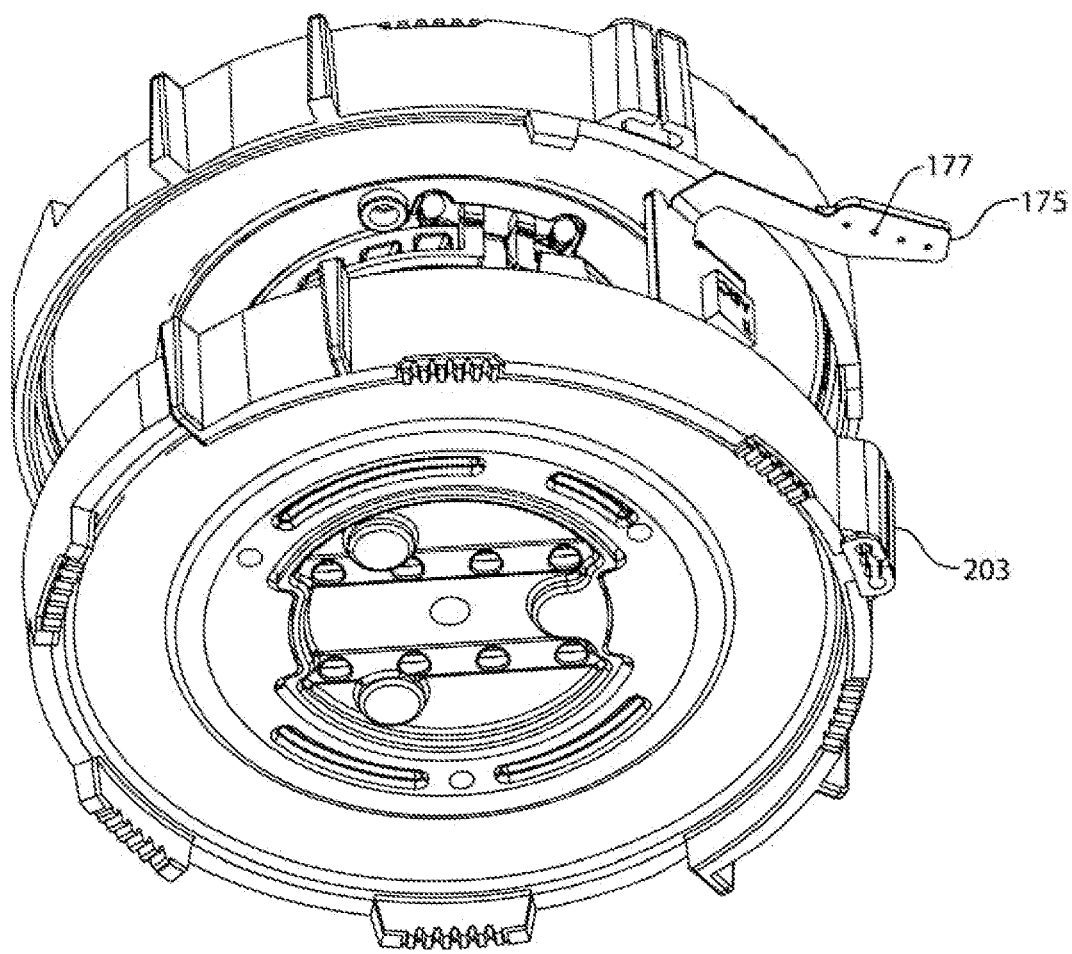
FIG. 37 is a perspective view of the synthetic jet actuator of FIG. 1 with the main chassis removed to show the details of the interior of the device.
Figure 38:
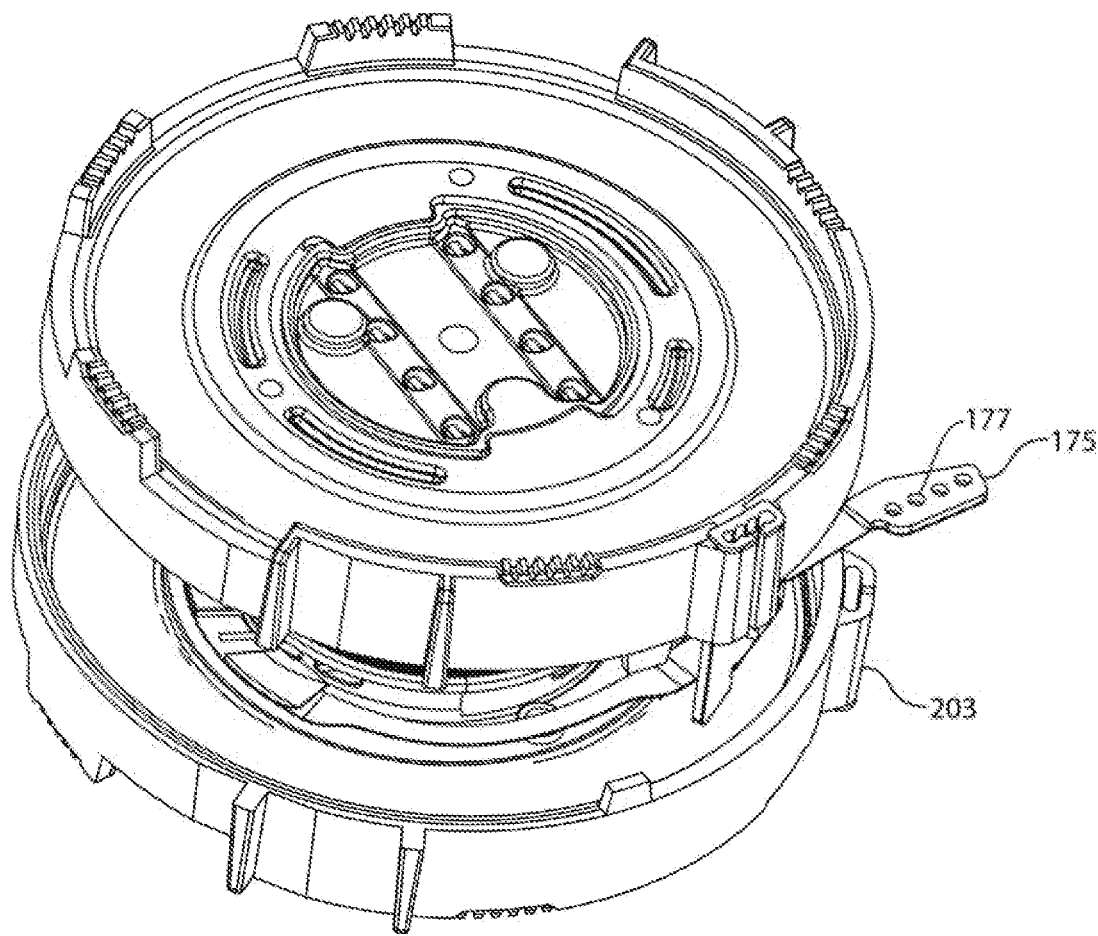
FIG. 38 is a perspective view of the synthetic jet actuator of FIG. 1 with the main chassis removed to show the details of the interior of the device.
Figure 39:
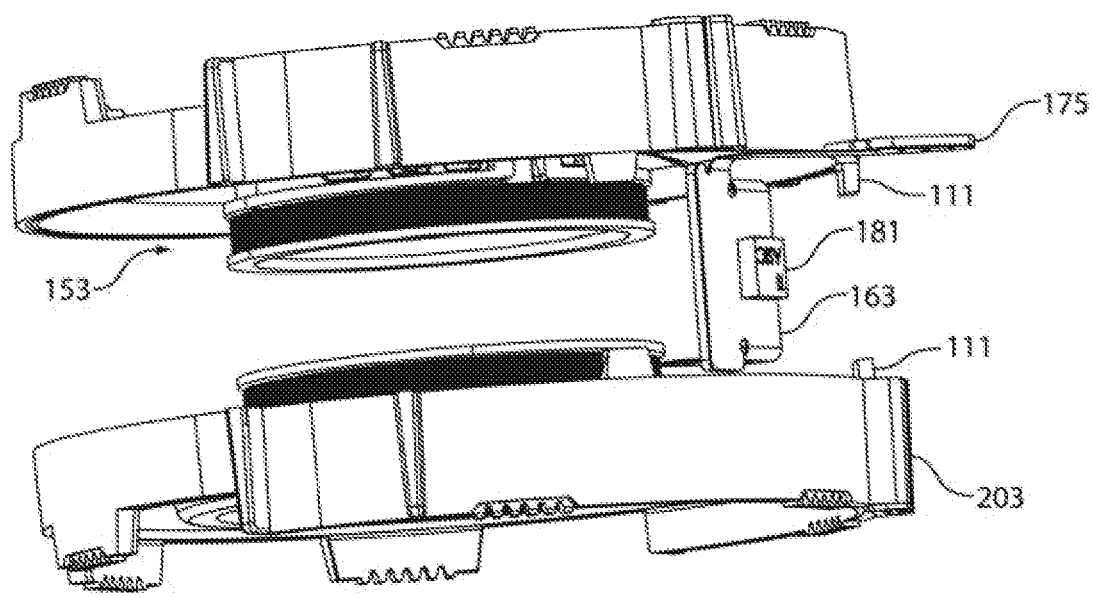
FIG. 39 is a perspective view of the synthetic jet actuator of FIG. 1 with the main chassis removed to show the details of the interior of the device.
Figure 40:
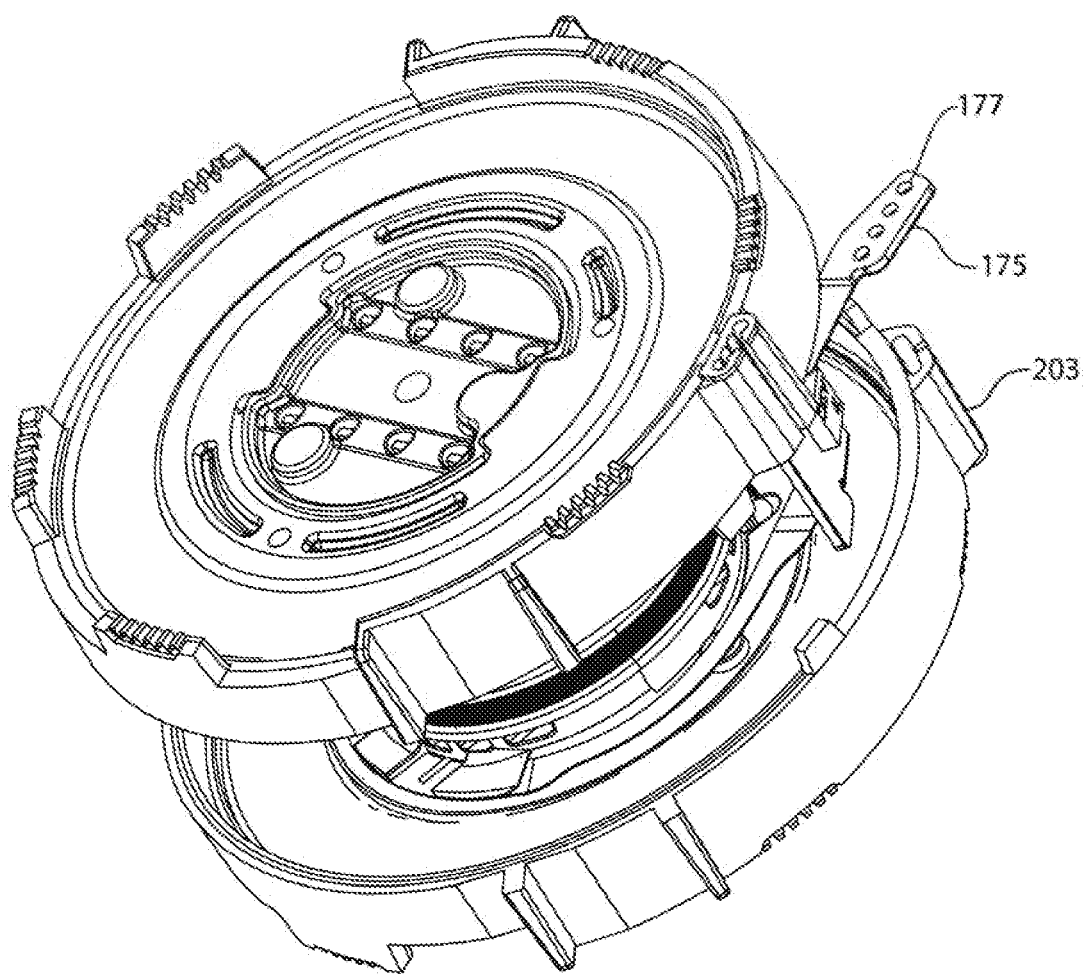
FIG. 40 is a perspective view of the synthetic jet actuator of FIG. 1 with the main chassis removed to show the details of the interior of the device.
Figure 41:
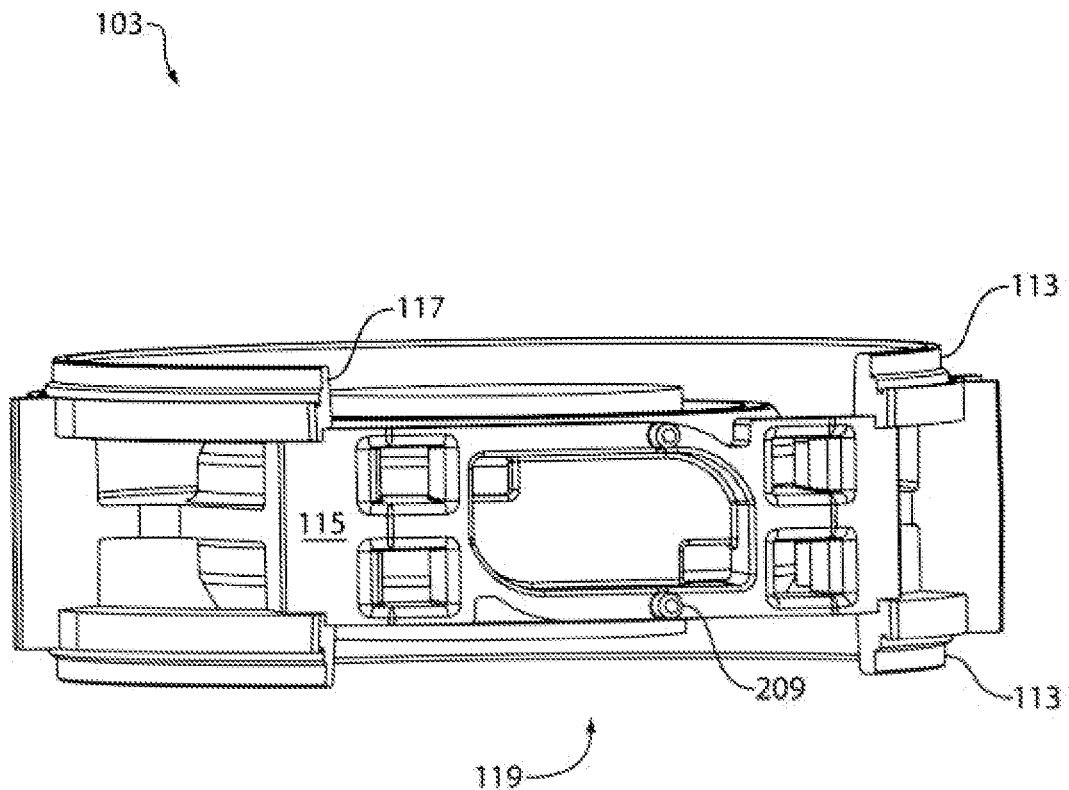
FIG. 41 is a perspective view of the main chassis of a synthetic jet actuator made in accordance with the teachings herein.
Figure 42:
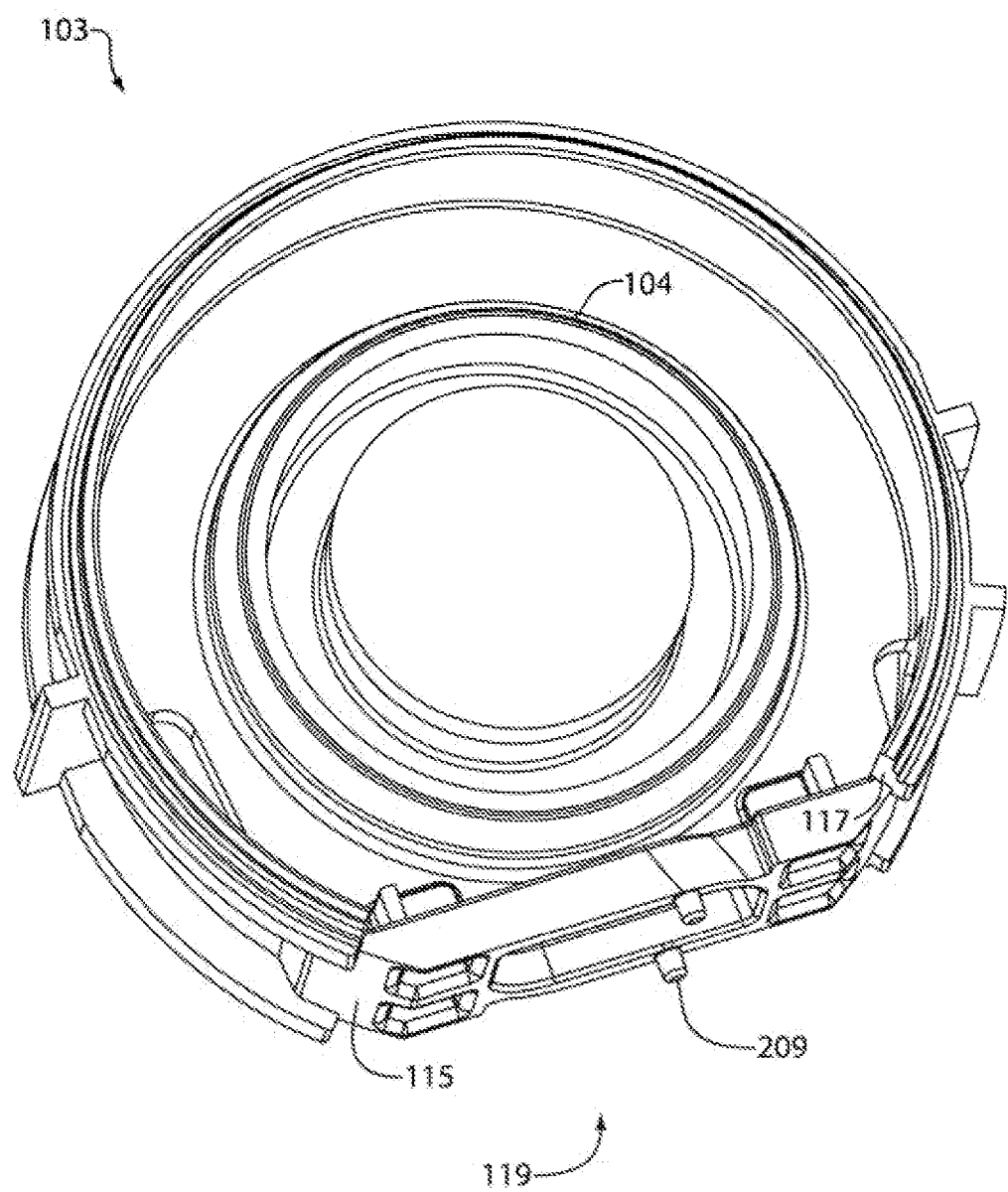
FIG. 42 is a perspective view of the main chassis of a synthetic jet actuator made in accordance with the teachings herein.
Figure 43:
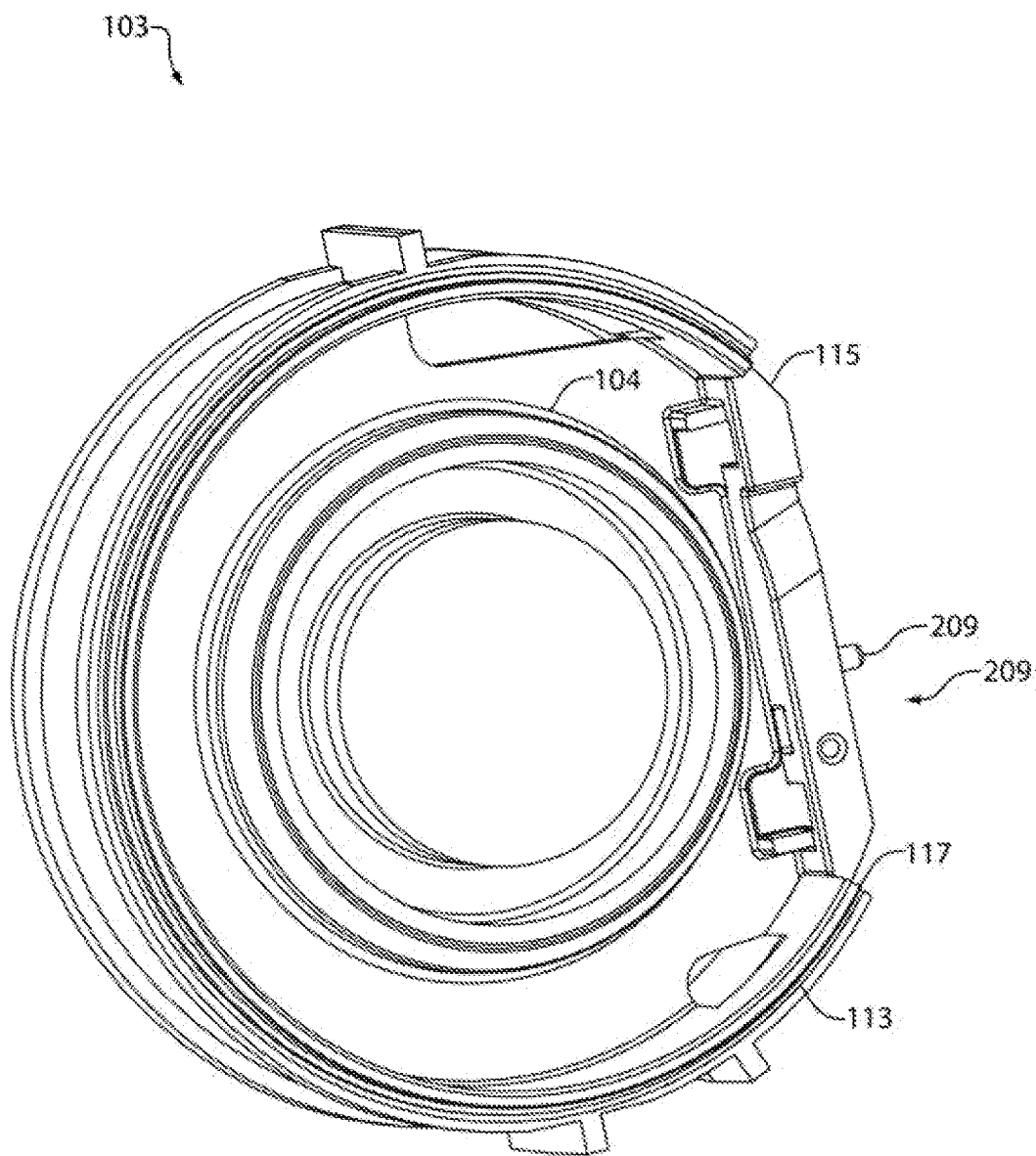
FIG. 43 is a perspective view of the main chassis of a synthetic jet actuator made in accordance with the teachings herein.
Figure 44:
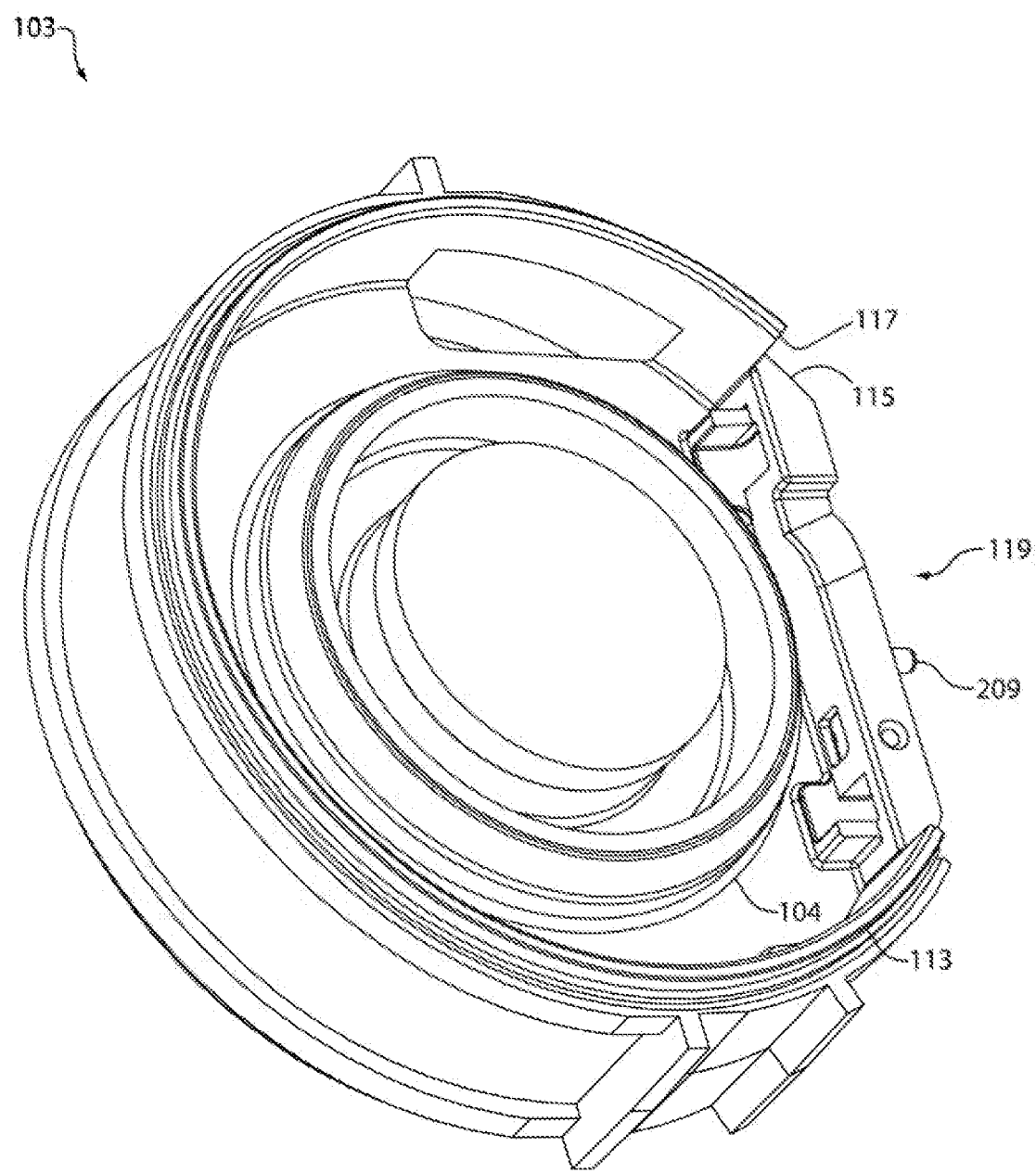
FIG. 44 is a perspective view of the main chassis of a synthetic jet actuator made in accordance with the teachings herein.
Figure 45:
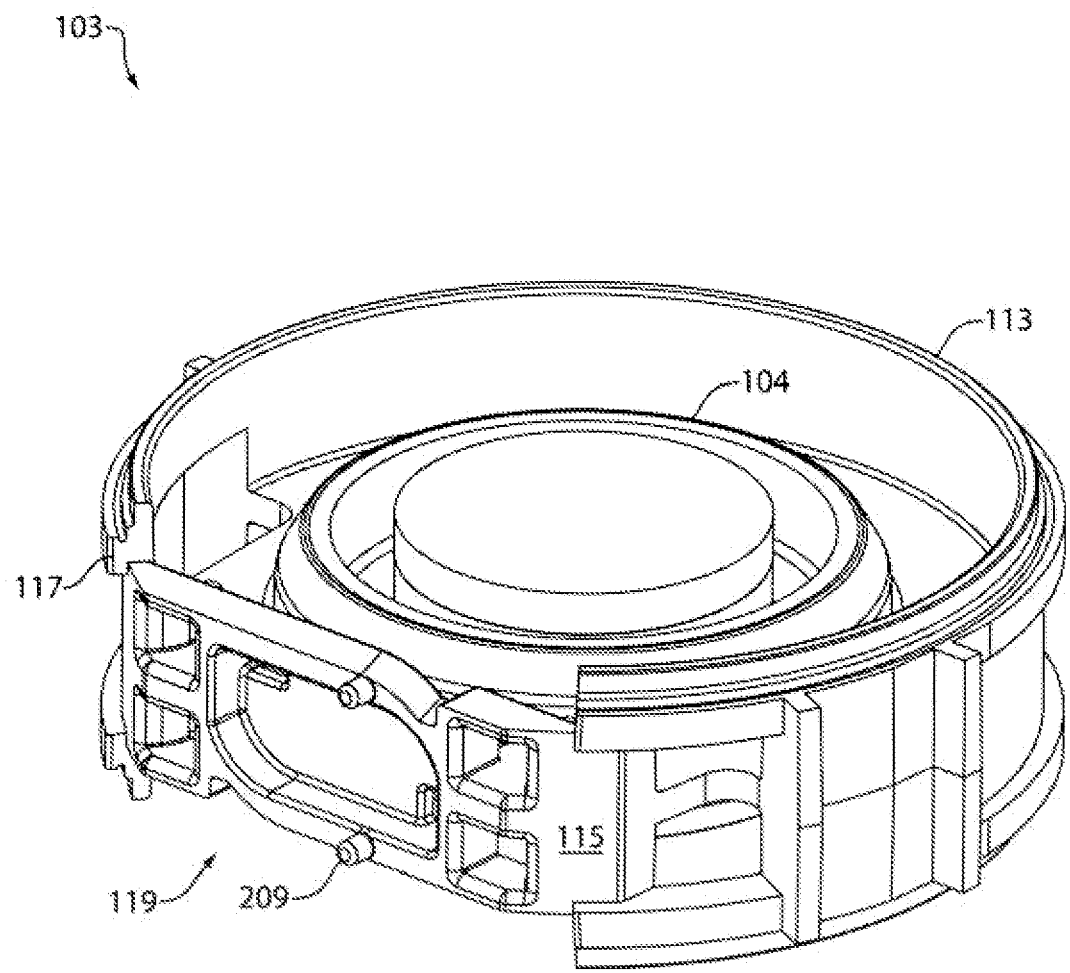
FIG. 45 is a perspective view of the main chassis of a synthetic jet actuator made in accordance with the teachings herein.
Figure 46:
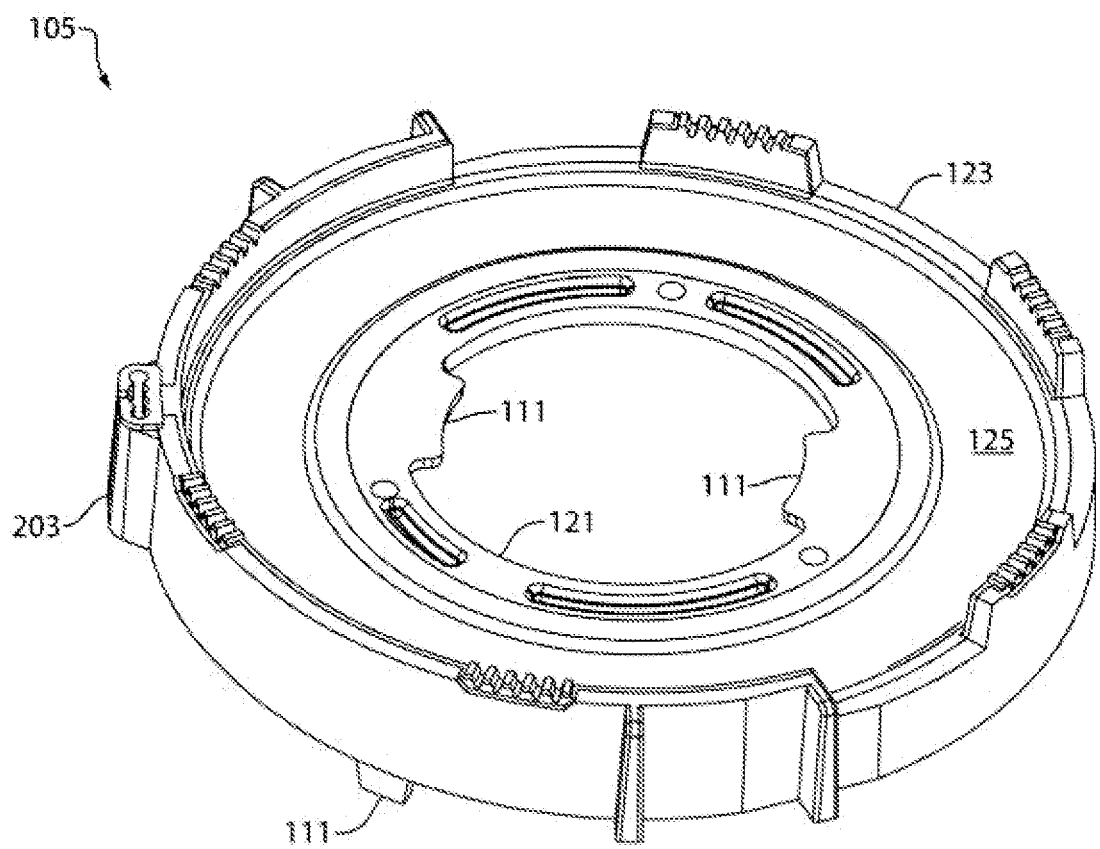
FIG. 46 is a perspective view of an auxiliary chassis component of the synthetic jet actuator of FIG. 1.
Figure 47:
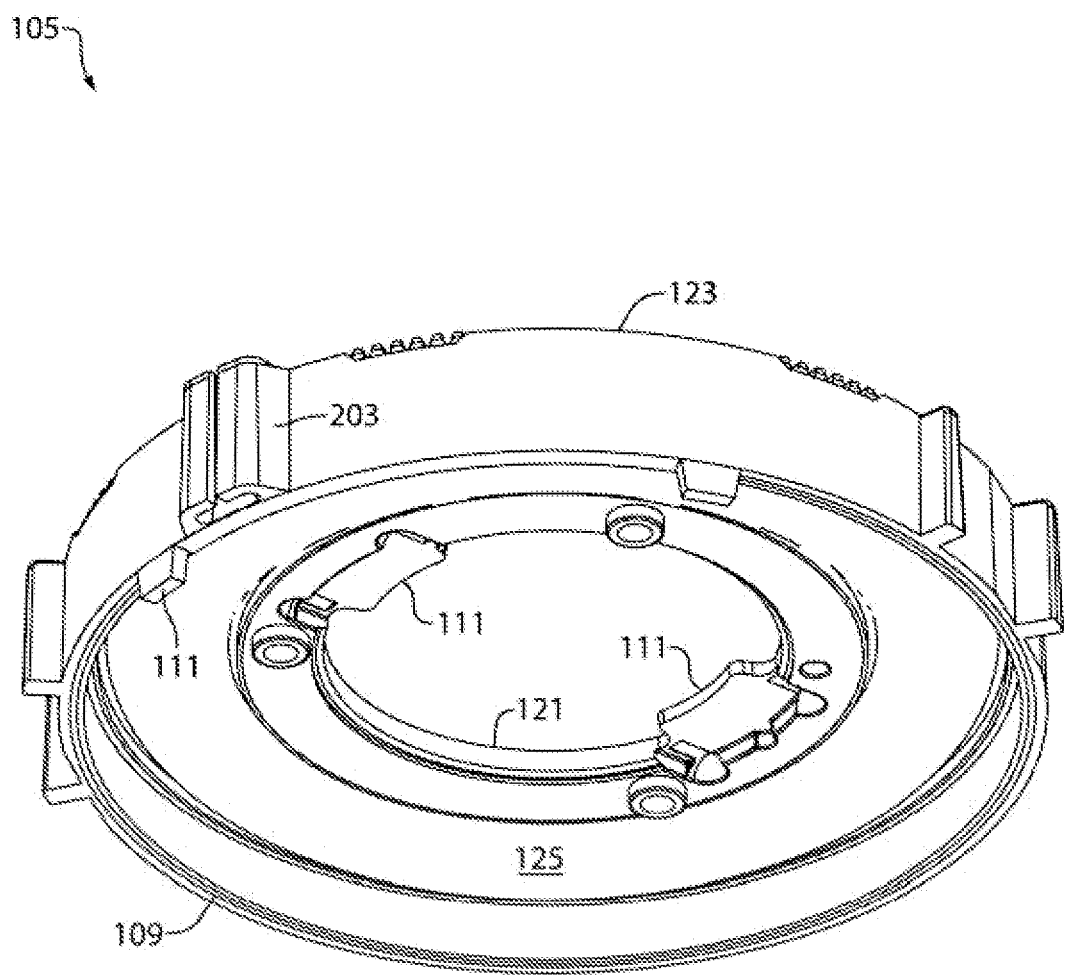
FIG. 47 is a perspective view of an auxiliary chassis component of the synthetic jet actuator of FIG. 1.
Figure 48:
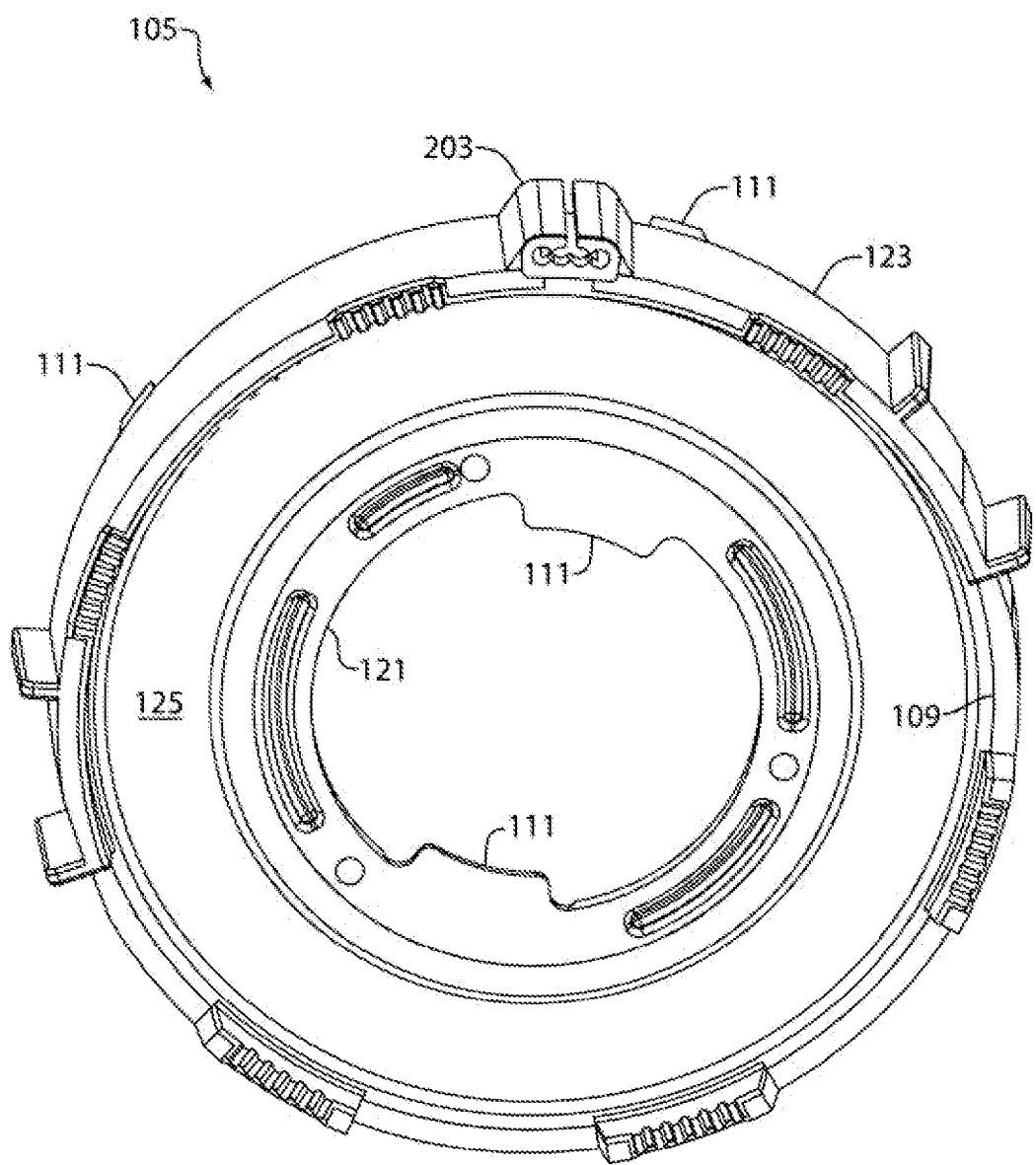
FIG. 48 is a perspective view of an auxiliary chassis component of the synthetic jet actuator of FIG. 1.

The manner in which the connector 161 is incorporated into the synthetic jet actuator 101 may be appreciated with respect to FIGS. 24-29. As best seen in FIGS. 26 and 29, the first terminal portion 169 of the connector 161 is mated with the first 141 and second 145 platform of a first voice coil 131 such that the protrusion 143 on the first platform 141 extends through an aperture 177 in the first terminal portion 169, and such that the protrusion 147 on the second platform 145 extends through another aperture 177 in the first terminal portion 169. The second terminal portion 171 is connected to a second voice coil 131 in a similar manner. The synthetic jet ejector 101 is then assembled as shown in the cross-sectional views of FIGS. 5-6.

Figure 2:
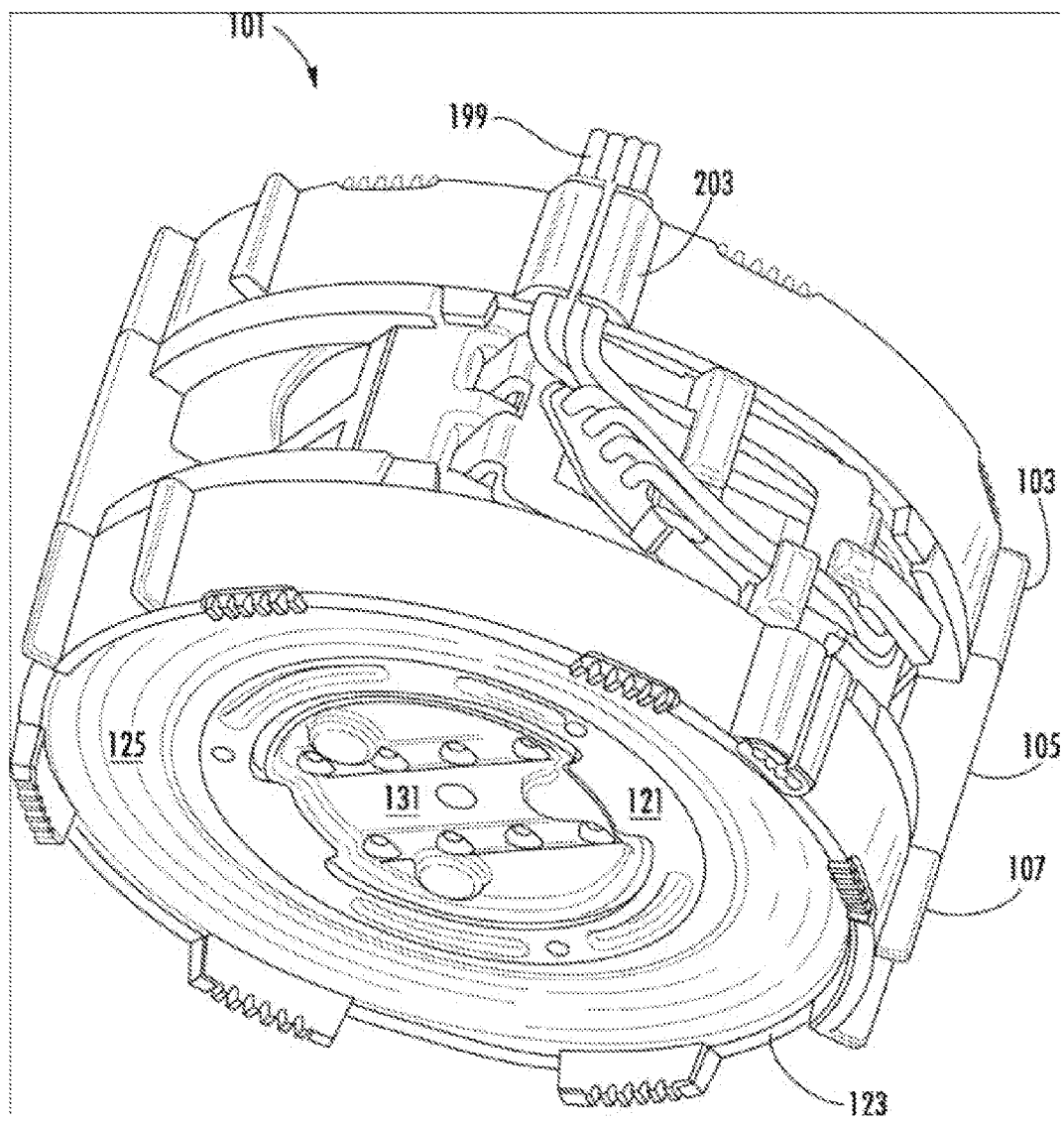
FIG. 2 is a perspective view of a synthetic jet actuator made in accordance with the teachings herein.
Figure 3:
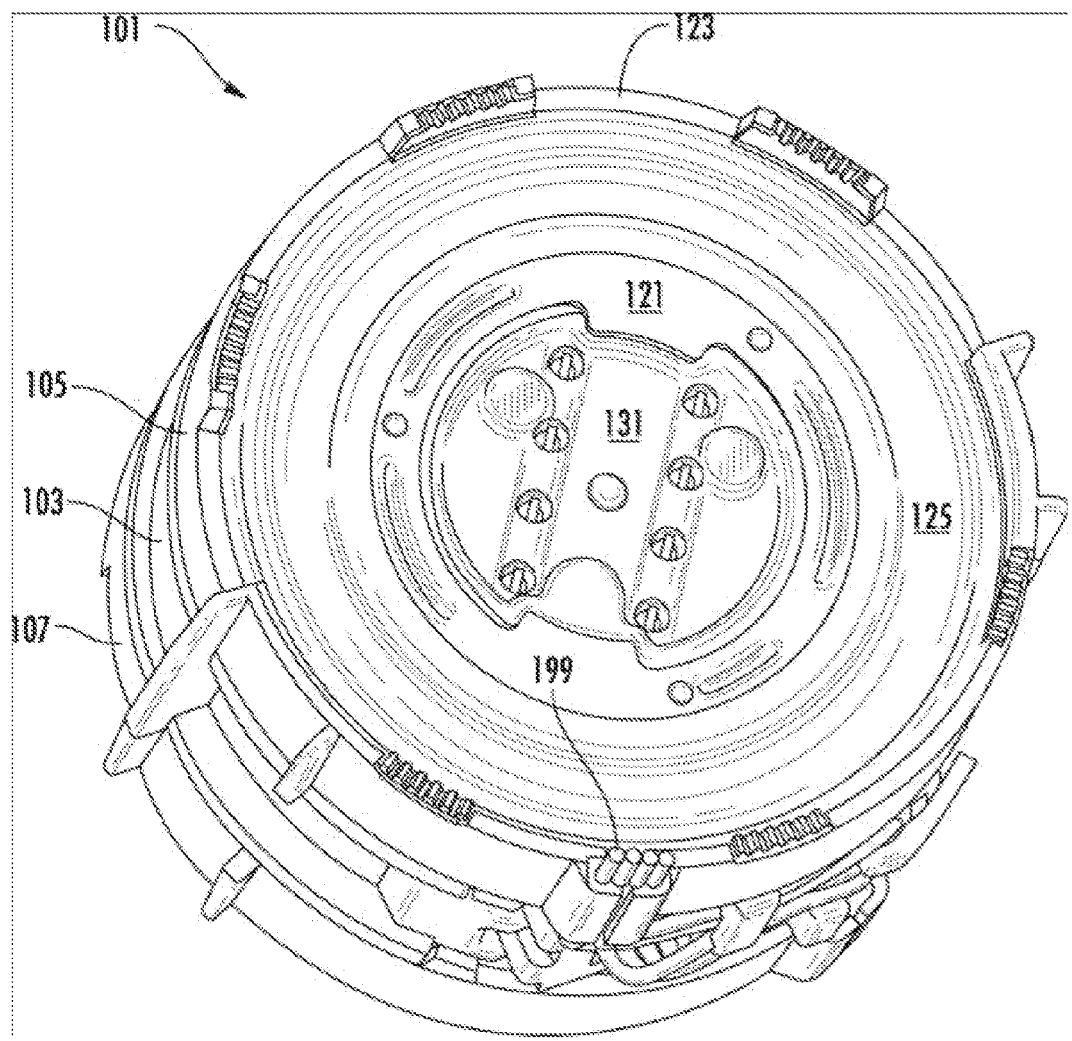
FIG. 3 is a perspective view of a synthetic jet actuator made in accordance with the teachings herein.
Figure 4:
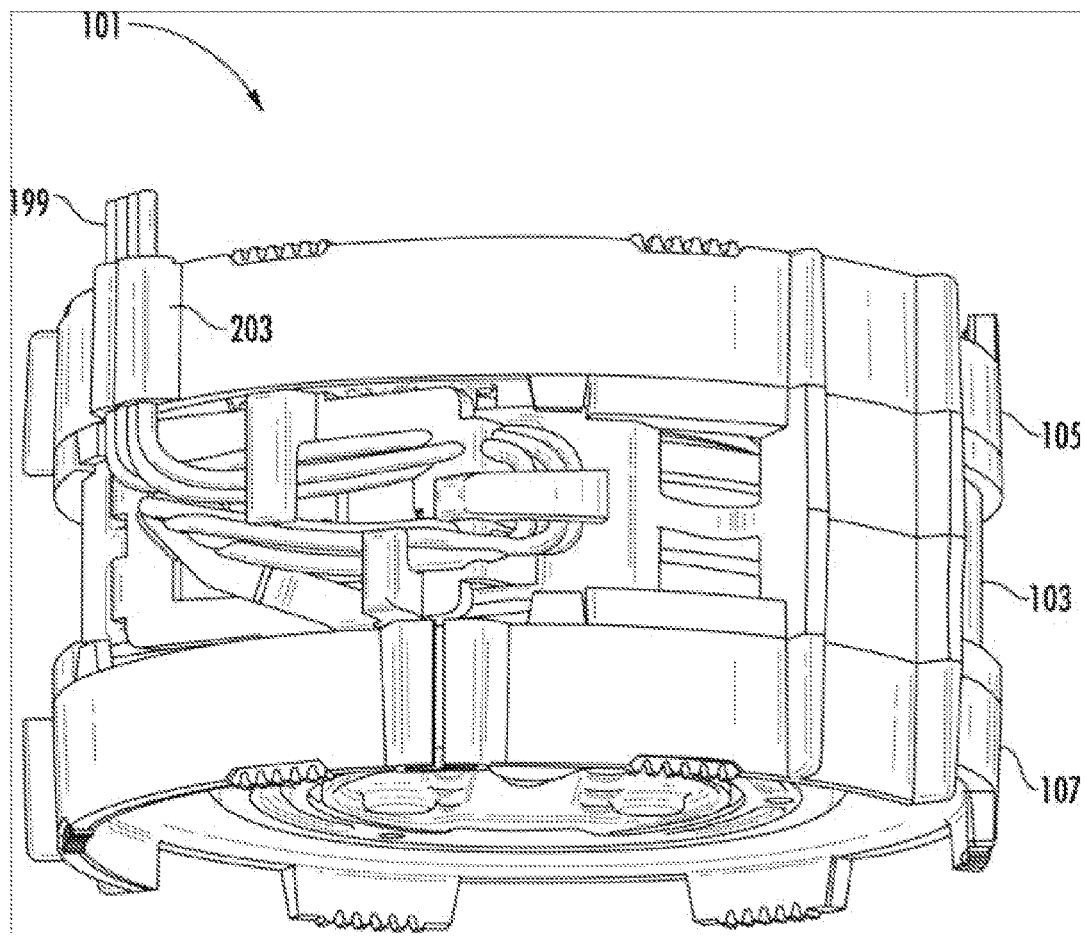
FIG. 4 is a perspective view of a synthetic jet actuator made in accordance with the teachings herein.
Figure 5:
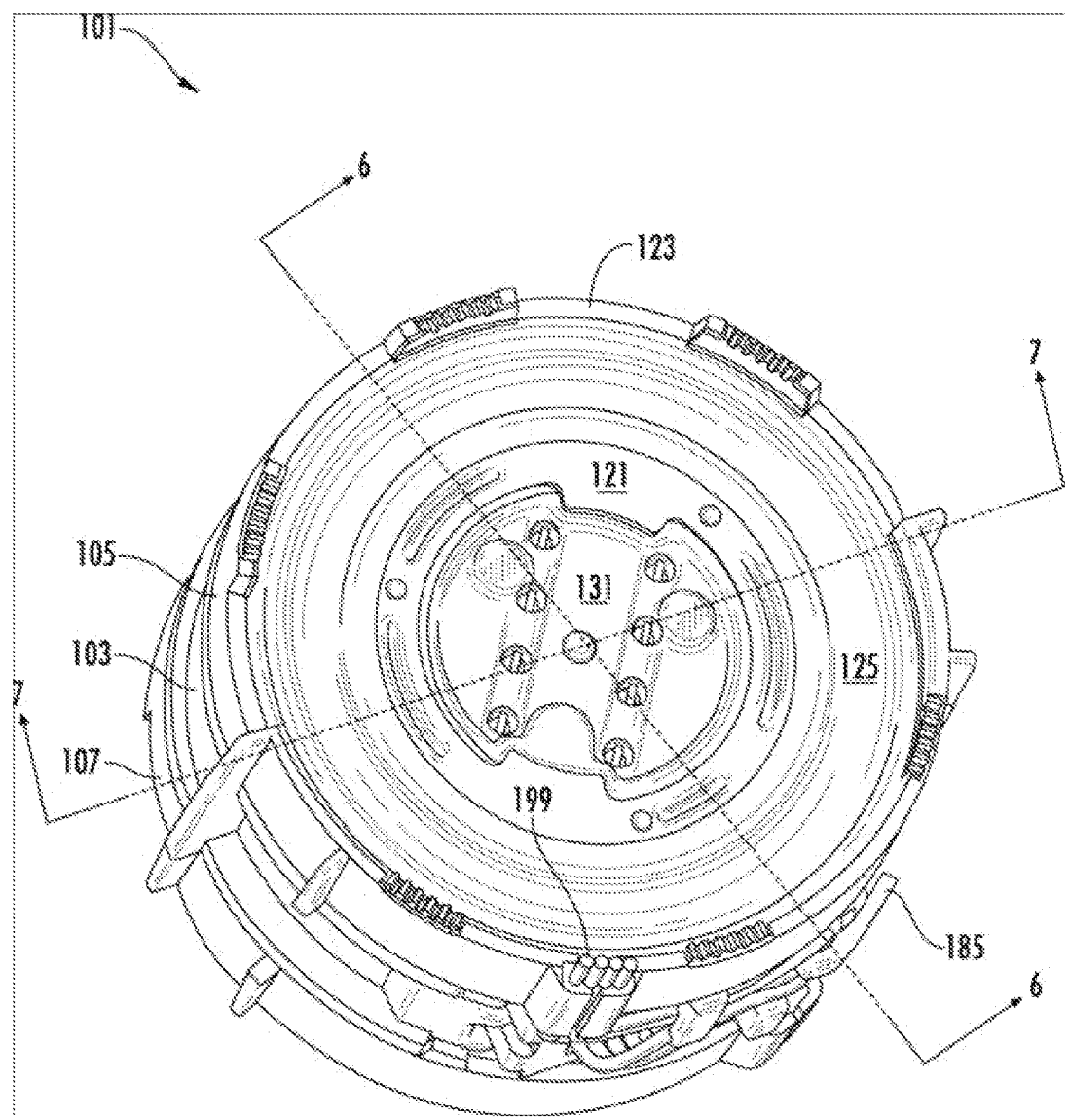
FIG. 5 is a perspective view of a synthetic jet actuator made in accordance with the teachings herein.
Figure 6:
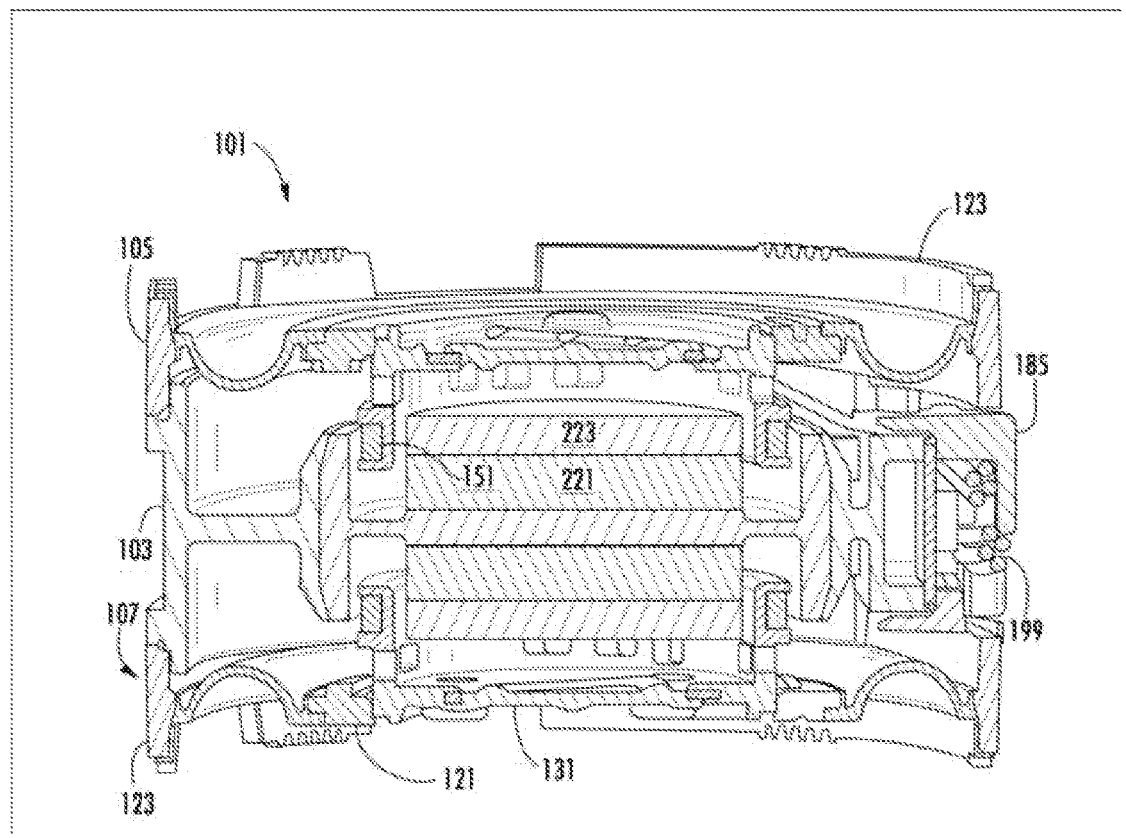
FIG. 6 is a cross-sectional view taken along LINE 4-4 of FIG. 4.
Figure 7:
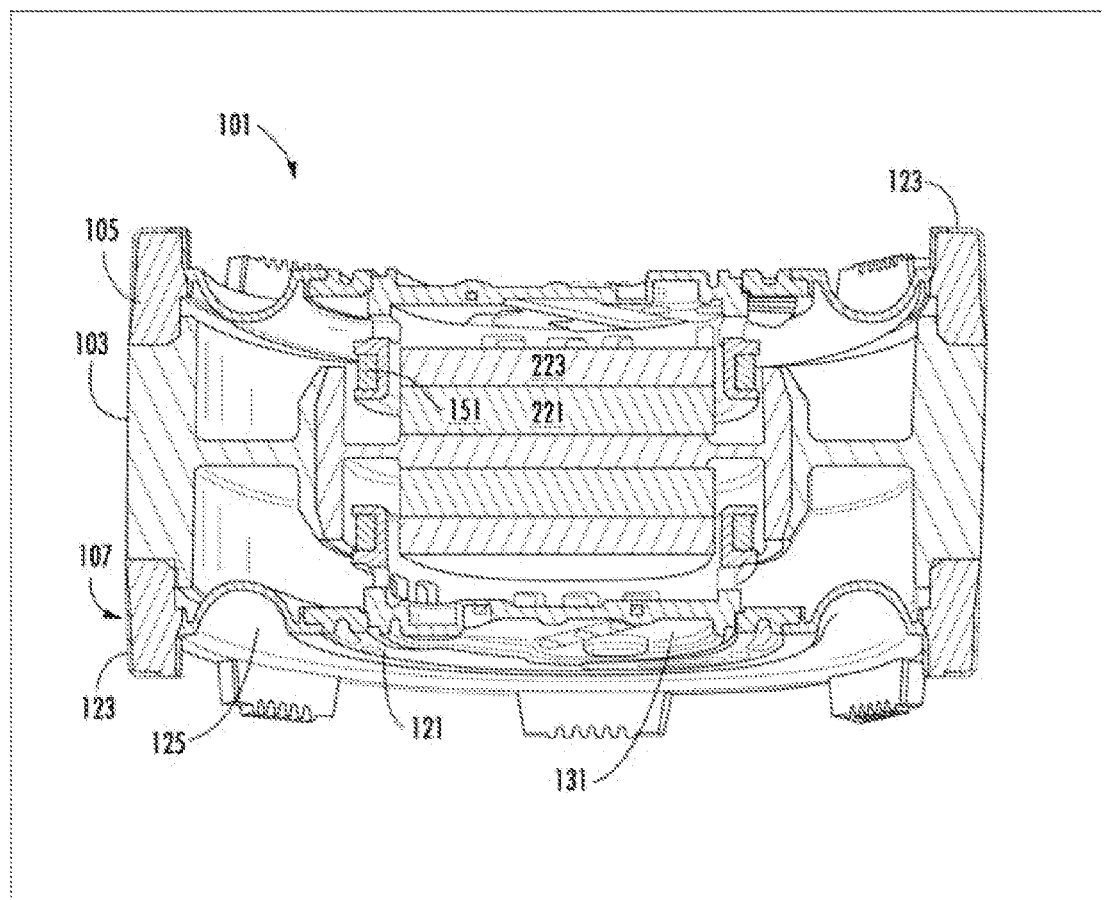
FIG. 7 is a cross-sectional view taken along LINE 6-6 of FIG. 4.
Figure 8:
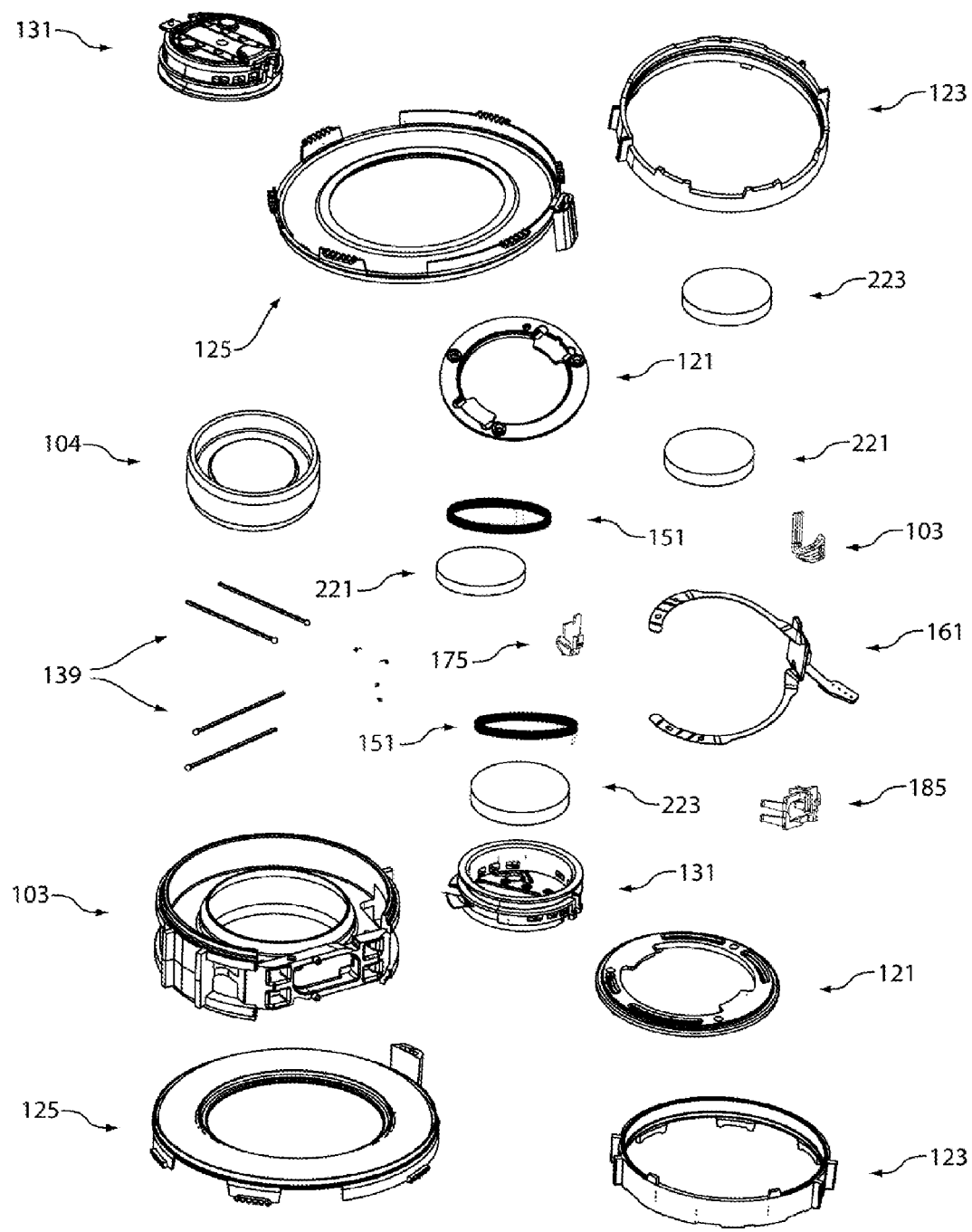
FIG. 8 is an exploded view of the synthetic jet actuator of FIG. 1.

Referring now to FIGS. 1-3, a wire clip 185 is mounted on the wiring manifold 119. As seen in FIGS. 50-55, the wire clip 185 is equipped with four prongs 187, each of which is inserted into one of four corresponding holes 189 provided in the wiring manifold 119 (see, e.g., FIG. 13). Each prong 187 on the wire clip 185 terminates in a hook 191 which catches on the lip of the hole 189 to secure the wire clip 185 in place. A set of opposing brackets 201, an essentially rectangular indentation 205, and a set of holes 207 (which mate with corresponding protrusions 209 in the main chassis 103; see, e.g., FIG. 13) are provided to ensure that the wire clip 185 is seated properly over the wiring manifold 119.

The wire clip 185 is further equipped with brackets 193, 195 and 197 (see FIGS. 50-55). As seen in FIGS. 1-3, the terminal ends of wires 199 from an external power source are inserted into the holes 177 of the third terminal portion 175 of the connector 161, thus bringing them into electrical communication with the circuitry disposed in the connector 161. The wires 199 are then wrapped around brackets 191, 193 and 195 in a snug manner, and are fed through conduit 203. This arrangement ensures a low profile for the wires 199, and also prevents them from becoming disconnected if force is applied to them.

Various modifications may be made to the devices and methodologies disclosed herein. For example, the connector 161 may have a variety of shapes and configurations, and may be manufactured in a variety of ways. The shape and dimensions of the connector 161, and the number of terminal portions it contains (if any), may vary in accordance with a number of factors including, for example, the number of voice coils in the synthetic jet actuator.

Similarly, while the synthetic jet actuators depicted herein feature dual opposing voice coils, one skilled in the art will appreciate that these devices may have any desirable number of voice coils, including a single voice coil or more than two voice coils.

It will further be appreciated that the synthetic jet actuators disclosed herein may be disposed in a variety of housings to produce synthetic jet ejectors of varying geometries, dimensions, and functionalities. For example, these housings may be designed to create any desired number of synthetic jets having any desired distribution, directionality, or profile. By way of example, the housing may be equipped with various channels, apertures, nozzles, vents, partitions, or other such features to create synthetic jets or to direct or modify synthetic jets or fluidic flow.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

APPENDIX A

Components

101: synthetic jet ejector
103: main chassis
104: bowl
105: first auxiliary chassis component
107: second auxiliary chassis component
109: beveled lip
111: tabs (of auxiliary chassis component)
113: lip (of main chassis)
115: faceted surface (of main chassis)
117: lip (of main chassis)
119: wiring manifold
121: inner ring
123: outer ring
125: diaphragm
131: voice coil
133: outer surface (of voice coil)
135: keys
139: pins
141: first platform
143: first protrusion
145: second platform
147: second protrusion
149: tabs
151: wiring
153: spool portion
155: bulbous cap
161: connector (flexible conductive)
163: central portion (of connector)
165: first arm (of connector)
167: second arm (of connector)
169: first terminal portion (of first arm)
171: second terminal portion (of second arm)
173: third arm (of connector)
175: third terminal portion (of third arm)
177: apertures (in first and second terminal portions of first and second arms)
181: chip
185: wire clip
187: prongs (of wire clip)
189: holes (in wiring manifold)
191: hook (on prong)
193: brackets (of wire clip)
195: brackets (of wire clip)
197: brackets (of wire clip)
199: wires
201: brackets (of wire clip)
203: conduit
205: rectangular indentation (of wire clip)
207: holes (in wire clip)
209: protrusion

What is claimed is:

1. A method for making a synthetic jet ejector, comprising:
    providing a first voice coil body having first and second channels defined therein;
    inserting first and second electrically conductive terminals into the first and second channels, respectively, of the first voice coil body;
    wrapping a first coil of wire around said first voice coil body such that a first end of the first coil is in electrical contact with the first terminal, and such that a second end of the first coil is in electrical contact with the second terminal; and
    attaching a first end of a flexible, electrically conductive connector to said first voice coil body such that the first end of the connector is in electrical contact with the first and second terminals.

2. The method of claim 1, further comprising:
    incorporating the first voice coil body into a synthetic jet ejector.

3. The method of claim 2, wherein the first voice coil body is incorporated into a voice coil of a synthetic jet ejector.

4. The method of claim 1, further comprising:
providing a second voice coil body having first and second channels defined therein;
inserting third and fourth electrically conductive terminals into the first and second channels, respectively, of the second voice coil body;
wrapping a second coil of wire around said second voice coil body such that a first end of the second coil is in electrical contact with the third terminal, and such that a second end of the first coil is in electrical contact with the fourth terminal; and
attaching a second end of said flexible, electrically conductive connector to said second voice coil body such that the second end of the connector is in electrical contact with the third and fourth terminals.

5. The method of claim 4, wherein said connector is formed by cutting said connector from a sheet of material.

6. The method of claim 1, wherein said connector is formed by cutting said connector from a planar sheet of a flexible, electrically conductive material.

7. The method of claim 1, wherein said connector is formed by cut as a single, continuous shape from a planar sheet of electrically conductive material.

8. A method for making a synthetic jet ejector, comprising:
providing first and second voice coil bodies having first and second sets of channels defined therein, respectively;
inserting first and second sets of electrically conductive terminals into the first and second sets of channels, respectively;
wrapping first and second coils of wire around said first and second voice coil bodies, respectively, such that the first coil is in electrical contact with the first set of terminals and such that the second coil is in electrical contact with the second set of terminals;
forming a voice coil subassembly by attaching first and second ends of a flexible, electrically conductive connector to said first and second voice coil bodies, respectively, wherein the first end of the connector is attached such that it is in electrical contact with the first set of terminals, and wherein the second end of the connector is attached such that it is in electrical contact with the second set of terminals; and
incorporating the voice coil subassembly into a synthetic jet ejector having first and second voice coils such that said first coil forms a portion of said first voice coil, and such that said second coil forms a portion of said second voice coil.

9. The method of claim 8, wherein the first and second sets of terminals releasably mate with the first and second sets of channels, respectively.

10. The method of claim 8, wherein each member of the first and second sets of terminals has a longitudinal body which terminates on a first end in a bulbous protrusion.

11. The method of claim 10, wherein the first set of terminals has first and second members, wherein a first end of the first coil is wrapped around the first member adjacent to the bulbous protrusion thereon, and wherein a second end of the first coil is wrapped around the second member adjacent to the bulbous protrusion thereon.

12. The method of claim 11, wherein the first and second voice coil bodies are generally cylindrical in shape, and wherein the first and second terminals are arranged in parallel and extend across the diameter of the cylinder.

13. The method of claim 11, wherein the second end of the longitudinal body of each of the first and second members is in electrical contact with a first end of the connector.

14. The method of claim 11, further comprising:
incorporating the first and second voice coil body into first and second voice coils, respectfully, of a synthetic jet ejector.

15. The method of claim 10, wherein the second set of terminals has first and second members, wherein a first end of the second coil is wrapped around the first member of the second set adjacent to the bulbous protrusion thereon, and wherein a second end of the second coil is wrapped around the second member of the second set adjacent to the bulbous protrusion thereon.

16. The method of claim 15, wherein the second end of the longitudinal body of each of the first and second members of the second set is in electrical contact with a second end of the connector.

17. The method of claim 16, wherein the connector has a semiconductor chip disposed on a surface thereof which controls the operation of the first and second voice coils.

18. The method of claim 16, wherein the connector has a terminal plate disposed thereon, and further comprising:
connecting an external power supply cable to the terminal plate.

19. The method of claim 8, wherein said connector is formed by cutting said connector from a sheet of material.

20. The method of claim 8, wherein said connector is formed by cutting said connector from a planar sheet of a flexible, electrically conductive material.

21. The method of claim 8, wherein said connector is formed by cut as a single, continuous shape from a planar sheet of electrically conductive material.

22. The method of claim 8, wherein the first and second sets of electrically conductive terminals are pins.

* * * * *